US007143264B2

(12) United States Patent
Debes et al.

(10) Patent No.: US 7,143,264 B2
(45) Date of Patent: Nov. 28, 2006

(54) APPARATUS AND METHOD FOR PERFORMING DATA ACCESS IN ACCORDANCE WITH MEMORY ACCESS PATTERNS

(75) Inventors: Eric Debes, Santa Clara, CA (US); Yen-Kuang Chen, Sunnyvale, CA (US); Matthew J. Holliman, Sunnyvale, CA (US); Minerva M. Yeung, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 10/268,166

(22) Filed: Oct. 10, 2002

(65) Prior Publication Data

US 2004/0073769 A1   Apr. 15, 2004

(51) Int. Cl.
*G06F 12/00* (2006.01)
(52) U.S. Cl. .................. 711/217; 711/213; 711/218
(58) Field of Classification Search ........ 711/213–217, 711/218, 118, 141–143, 137; 712/207
See application file for complete search history.

(56) References Cited

U.S. PATENT DOCUMENTS

| | | | | |
|---|---|---|---|---|
| 5,287,487 A | * | 2/1994 | Priem et al. ................ | 711/204 |
| 5,341,318 A | * | 8/1994 | Balkanski et al. ........... | 708/402 |
| 5,459,852 A | | 10/1995 | Nakagawa et al. | |
| 5,513,366 A | * | 4/1996 | Agarwal et al. ............. | 712/22 |
| 5,854,921 A | * | 12/1998 | Pickett ...................... | 712/239 |
| 5,941,981 A | * | 8/1999 | Tran .......................... | 712/207 |
| 6,122,442 A | * | 9/2000 | Purcell et al. .............. | 345/620 |
| 6,415,356 B1 | * | 7/2002 | Chaudhry et al. ........... | 711/118 |
| 6,515,664 B1 | * | 2/2003 | Hii ............................ | 345/427 |
| 6,760,818 B1 | * | 7/2004 | van de Waerdt ........... | 711/137 |

OTHER PUBLICATIONS

Lee, Ruby, B, "Multimedia Extensions for General-Purpose Processors", Signal Processing Systems, 1977 -Design and Implementation, 1997 IEEE, pp. 9-23.
Thakkar, S. et al., "The Internet Streaming SIMD Extensions", Intel Technology Journal 02, 1999, pp. 1-8.
El-Mahdy, A.H.M.R., "A Vector Architecture for Multimedia Java Applications", PhD Thesis, Dept. of Computer Science, Univ. of Manchester, 2001, pp. 1-10, 55-137, 193-194, 201, 207-213.
Co-pending PCT appl PCT/US03/30572 Annext to Form PCT/ISA/206, Comm. Relating to the Results of the Partial Int'l Search, mailed Jan. 11, 2005.
Cucchiara, R., et al., "Exploiting Cache in Multimedia", Multimedia Computing & Systems, 1999, IEEE Int'l Conf. on Florence, Italy, Jun. 7-11, 1999, pp. 345-350.

(Continued)

*Primary Examiner*—Nasser Moazzami
(74) *Attorney, Agent, or Firm*—Blakely, Sokoloff, Taylor & Zafman LLP

(57) ABSTRACT

An apparatus and method for performing data access in accordance with memory access patterns are described. In one embodiment, the method includes the determination, in response to a memory access instruction, of a memory access pattern of data requested by the memory access instruction. Once the memory access pattern is determined, the data requested by the memory access instruction is accessed according to the determined memory access pattern. Finally, once the data is accessed, the data is processed according to the memory access instruction. Accordingly, in this embodiment of the present invention, data is accessed according to memory access patterns including zig-zag patterns scan, Zerotree scan, bit plane extraction, fine granularity scalability or the like.

37 Claims, 19 Drawing Sheets

OTHER PUBLICATIONS

Juurlink, B., et al., "Implementation and Evaluation of the Complex Streamed Instruction Set", Sep. 8, 2001, Parallel Architectures & Compilation Tech., 2001 Proceedings, IEEE, pp. 73-82.

Corbal, J., et al., "Exploiting A New Level of DLP in Multimedia Applications", Proc. of 32nd Annual ACM/IEEE Int'l Symposium on Architecture, Nov. 16, 1999, pp. 72-79.

Diefendorff, K., et al., "AltiVec Extension to PowerPC Accelerates Media Processing", IEEE Micro, IEEE, vol. 20, No. 2, Mar. 2000, pp. 85-95.

Debes, E., et al., "Characterizing Multimedia, Kernels on General-Purpose Processors", ICME '02 Proc., IEEE, vol. 2, Aug. 26, 2002, pp. 113-116.

Krishnaiyer, R., et al., "Advanced Optimizer for the IA-64 Architecture", IEEE Micro; Nov. 6, 2000, vol. 20, No. 6, pp. 60-68.

Lappalainen, V., et al., "Overview of Research Efforts on Media ISA Extensions & Their Transactions on Circuits and Systems for Video Technology", IEEE, vol. 12, No. 8, Aug. 2002, pp. 660-670.

\* cited by examiner

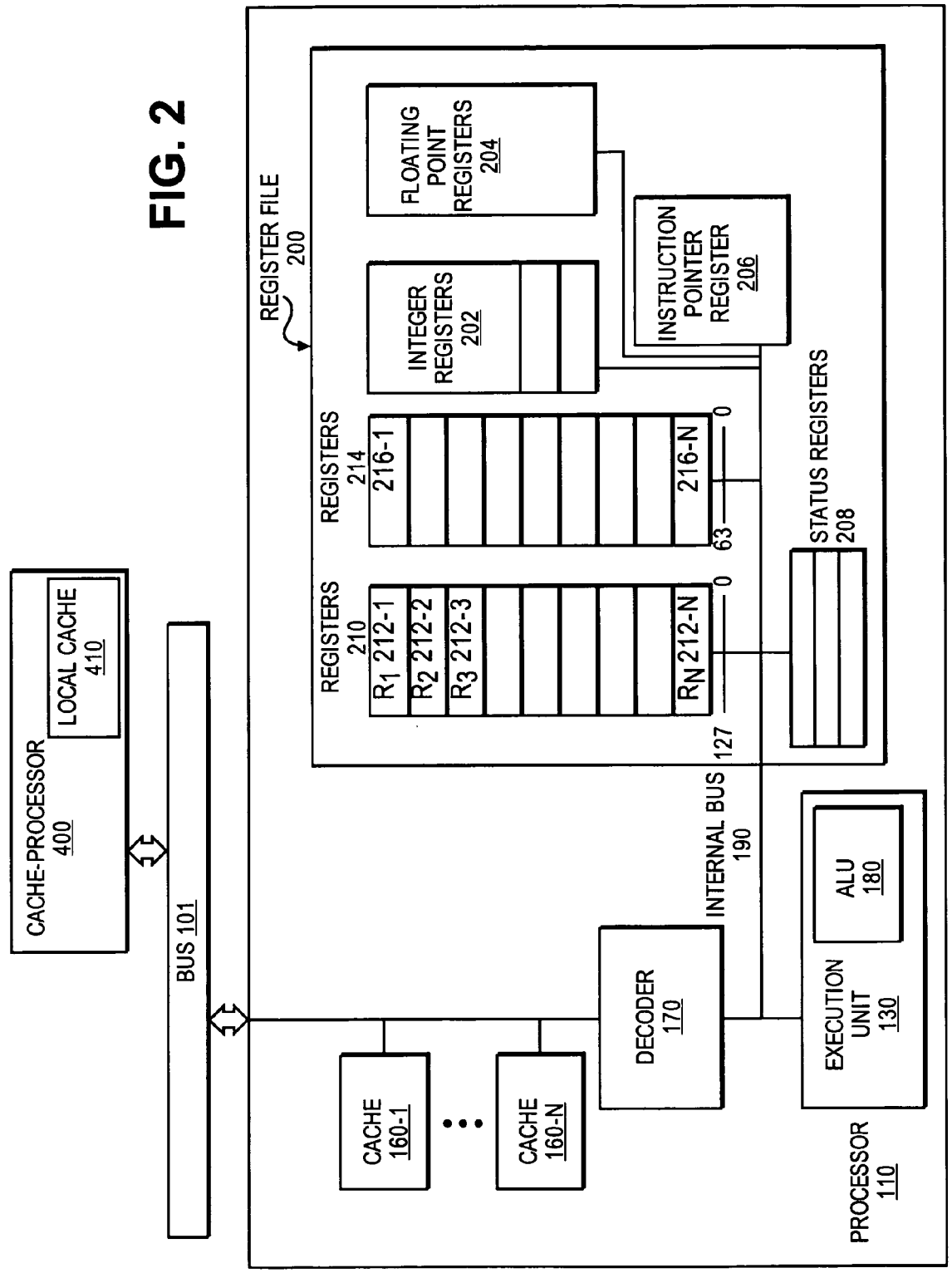

CONVENTIONAL RASTER SCAN MEMORY ARRANGEMENT 300

APPARATUS AND METHOD FOR PERFORMING DATA ACCESS IN ACCORDANCE WITH MEMORY ACCESS PATTERNS

FIELD OF THE INVENTION

One or more embodiments of the invention relates generally to the field of memory access. More particularly, one embodiment of the invention relates to a method and apparatus for performing data access in accordance with memory access patterns.

BACKGROUND OF THE INVENTION

Media applications have been driving microprocessor development for more than a decade. In fact, future media applications will place even higher computational requirements on available microprocessors. As a result, tomorrow's personal computing (PC) experiences will be even richer in audio/video effects as well as being easier to use. More importantly, future microprocessors will enable computing to merge with communications.

Accordingly, the display of images is increasingly popular for current, as well as future, computing devices. Unfortunately, the quantity of data required for these types of media applications tends to be very large. In addition, increases in computational power, memory and disk storage, as well as network bandwidth, have facilitated the creation and use of larger and higher quality images. However, the use of larger and higher quality images often results in a bottleneck between the processor and memory. As such, image/video processing (media) applications often suffer from memory latency problems in spite of the fact that microprocessor clock speeds are continuously increasing.

Although Random Access Memory (RAM) claims to provide random access to the memory contained therein, RAM is not generally accessible in a random pattern. In fact, the time required to access different portions of the RAM may vary. For example, horizontal access of memory locations within a memory device is generally quite expedient. In contrast, vertical memory access is quite slow when utilizing conventional memory devices.

As a result, raster-scan memory arrangements for video images place pixel data linearly across the image plane within a cache memory, which often lead to numerous problems. First, a cache line holds some parts of several basic image blocks (e.g., 8×8 or 16×16). In contrast, a basic image block is contained in several cache lines. As such, accessing a block, say 8×8, is equivalent to accessing several cache lines (e.g. at least 8 cache lines in current architectures under the assumption that we are dealing with images wider than a single cache line).

Accessing an image using conventional memory devices requires at least eight memory accesses. Furthermore, it is likely that eight software pre-caching instructions are required in order to avoid having eight cache misses. Moreover, when processing an image block, conventional applications load superfluous data into the cache in addition to the block itself. Consequently, unless nearby blocks are processed immediately, superfluous data is brought into the cache memory, which reduces the cache efficiency due to the superfluous data.

One solution for providing improved cache localities when processing image data involves block based memory arrangements. Although block based memory arrangement schemes provides higher cache localities, access to a vertical set of 8- or 16 pixels using one instruction is still not supported. To access a vertical set of data, most conventional implementations use pack and unpack operations to transpose the data. Unfortunately, this is a slow procedure in most of the applications. Moreover, in some applications, such as image/video compression, the pixel data must be accessed in varying scan orders, which is nearly a random access of the pixel data.

Furthermore, various video/image algorithms and matrix operations require data access according to varying memory access patterns, as well as bit-plane extraction. In fact, data access according to varying memory access patterns is required by image and video encoding applications including, for example, zerotree image coding, zig-zag scan for discrete cosign transfer (DCT), bit plane extraction in joint photographic experts (JPEG) 2000 and motion picture experts group-four (MPEG-4) fine granularity scalability. Unfortunately, bitplane encoding in the JPEG2000 image coding standard can take up to 40% of the central processing unit (CPU) execution time in conventional image/video systems. Therefore, there remains a need to overcome one or more of the limitations in the above-described, existing art.

BRIEF DESCRIPTION OF THE DRAWINGS

The various embodiments of the present invention are illustrated by way of example, and not by way of limitation, in the figures of the accompanying drawings and in which:

FIG. 2 depicts a block diagram further illustrating the processor as depicted in FIG. 1 in accordance with a further embodiment of the present invention.

DETAILED DESCRIPTION

Figure 1:
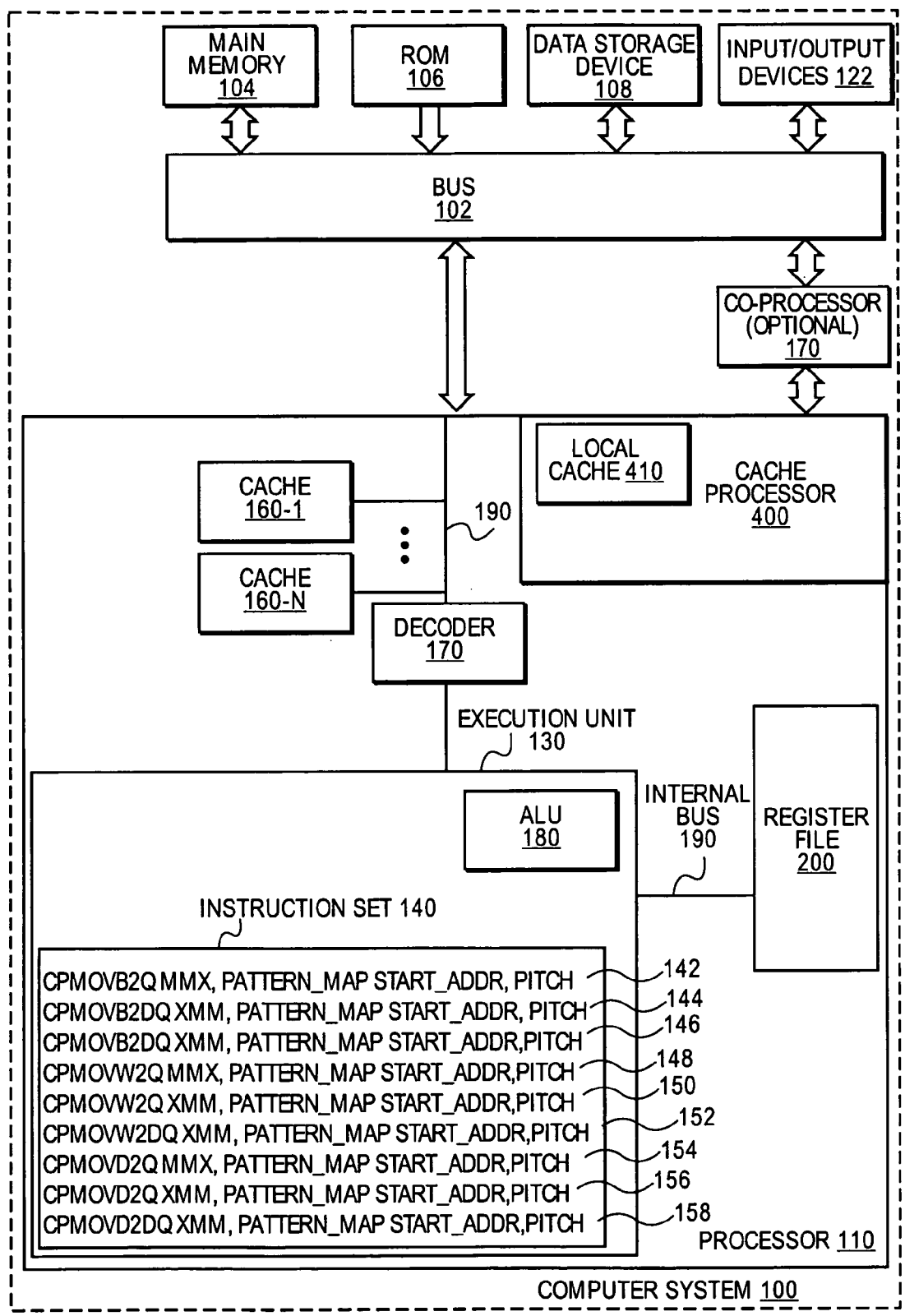
FIG. 1 depicts a block diagram illustrating a computer system implementing a cache processor in accordance with one embodiment of the present invention.

A method and apparatus for performing data access in accordance with memory access patterns are described. In one embodiment, the method includes the determination, in response to a memory access instruction, of a memory access pattern of data associated with the memory access instruction. Once the memory access pattern is determined, the data associated with the memory access instruction is accessed according to the determined memory access pattern. Finally, once the data is accessed, the data is stored according to the memory access instruction. Accordingly, in this embodiment of the present invention, data is accessed according to memory access patterns including zig-zag patterns scan, Zerotree scan, bit plane extraction, fine granularity scalability or the like, to enable memory access according to random memory access patterns.

In the following description, for the purposes of explanation, numerous specific details are set forth in order to provide a thorough understanding of embodiments of the present invention. It will be apparent, however, to one skilled in the art that the various embodiments of the present invention may be practiced without some of these specific details. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible embodiments of the present invention. In other instances, well-known structures and devices are shown in block diagram form in order to avoid obscuring the details of the embodiments of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the embodiments herein, or it may prove convenient to construct more specialized apparatus to perform the required method. For example, any of the methods according to embodiments of the present invention can be implemented in hard-wired circuitry, by programming a general-purpose processor, or by any combination of hardware and software.

One of skill in the art will immediately appreciate that embodiments of the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The embodiments of the invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

In an embodiment, the methods of the present invention are embodied in machine-executable instructions. The instructions can be used to cause a general-purpose or special-purpose processor that is programmed with the instructions to perform the methods of the present invention. Alternatively, the methods of the embodiments of the present invention might be performed by specific hardware components that contain hardwired logic for performing the methods, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

Computing Architecture

FIG. 1 shows a computer system 100 upon which one embodiment of the present invention can be implemented. Computer system 100 comprises a bus 102 for communicating information, and processor (CPU) 110 coupled to bus 102 for processing information. The computer system 100 also includes a memory subsystem 104–108 coupled to bus 102 for storing information and instructions for processor 110. Processor 110 includes an execution unit 130 containing an arithmetic logic unit (ALU) 180, a register file 200, one or more cache memories 160 (160-1, . . . , 160-N), a decoder 170 and an internal bus 190. In addition, the system 100 includes a co-processor 400, including a local cache (data buffer) 410, referred to herein as cache processor 400.

High speed, temporary memory buffers (cache) 160 are coupled to execution unit 130 and store frequently and/or recently used information for processor 110. As described herein, memory buffers 160, as well as local data buffer 400, include but are not limited to cache memories, solid state memories, RAM, synchronous RAM (SRAM), synchronous data RAM (SDRAM) or any device capable of supporting high speed buffering of data. Accordingly, high speed, temporary memory buffers 160 are referred to interchangeably as cache memories 160 or one or more memory buffers 160 while high speed, temporary memory buffers 410 are referred to interchangably as local cache 410 or local data buffer 410.

In addition, it should be noted that in an alternative embodiment, the term memory buffer refers to the external memory 104. However, in contrast to video/image processing systems, the system 100 includes a cache processor 400. As described in further detail below, the cache processor 400 is used to hide memory access time from CPU 110 by performing necessary data transformation in local cache 410 when accessing data according to a memory access pattern 110. As a result, one embodiment enables data access according to random memory access patterns while avoiding the processor to memory bottleneck.

The computer system also includes register file 200, which is utilized to store the data accessed by processor 110 and is coupled to execution unit 130 via internal bus 170. In one embodiment, the register file 200 includes multimedia registers, for example, SIMD (single instruction, multiple data) registers for storing multimedia information. In one embodiment, multimedia registers each store up to one hundred twenty-eight bits of packed data. Multimedia registers may be dedicated multimedia registers or registers which are used for storing multimedia information and other information. In one embodiment, multimedia registers store multimedia data when performing multimedia operations and store floating point data when performing floating point operations.

In one embodiment, execution unit 130 operates on image/video data according to the instructions received by processor 110 that are included in instruction set 140. Execution unit 130 also operates on packed, floating-point and scalar data according to instructions implemented in general-purpose processors. Processor 110 as well as cache processor 400 are capable of supporting the Pentium® microprocessor instruction set as well as packed instructions, which operate on packed data. By including a packed instruction set in a standard microprocessor instruction set, such as the Pentium® microprocessor instruction set, packed data instructions can be easily incorporated into existing software (previously written for the standard microprocessor instruction set). Other standard instruction sets, such as the PowerPC™ and the Alpha™ processor instruction sets may also be used in accordance with the described invention. (Pentium® is a registered trademark of Intel Corporation. PowerPC™ is a trademark of IBM, APPLE COMPUTER and MOTOROLA. Alpha™ is a trademark of Digital Equipment Corporation.)

In one embodiment, the invention provides a plurality of cache processor (CP) move (CPMOV) instructions, which are collectively referred to herein as CP load operations or instructions. In addition, in embodiments described, the CP load, as well as CPMOV, instructions may be referred as memory-access instructions. In one embodiment, the memory-access instruction includes CP write and CP read operations.

Accordingly, as illustrated in FIG. 1, the instruction set includes CP move operations supporting byte data (instructions 142–146), word data (instructions 148–152) and doubleword data (instructions 154–158). Utilizing these operations, current image processing techniques may be improved by shielding the CPU 110 from costly memory access of data according to non-standard or special data access patterns including, for example, zig-zag scan, zerotree coding, bitplane extraction, MPEG4 fine granularity scalability or the like, which are the required image/video coding application.

The parameters MMX and XMM in the embodiments described refer to 64-bit registers, for example, registers 214 as depicted in FIG. 2, and 128-bit registers, such as registers 210 as depicted in FIG. 2. The PATTERN-MAP parameter specifies a memory location containing a plurality of addresses defining a memory access pattern according to which data is accessed in the embodiment described. The START_ADDR parameter refers to a start address within an image block, while the OFFSET parameter refers to an address offset from a prior or start address. As described in further detail below, the CPMOV operations, which are collectively referred to as CP load operations, enable non-horizontally/non-vertically sequential (random) memory access of data utilizing the local cache 410.

By including the instruction set 140 in the instruction set of the general-purpose processor 110, along with associated circuitry to execute the instructions, the operations used by many existing multimedia applications may more efficiently perform image/video processing using a general-purpose processor. Thus, multimedia applications including video/image coding may be accelerated and executed more efficiently by utilizing a single instruction to perform memory access of an image block according to non-standard or random memory access patterns. In addition, packed instructions enable using the full width of a processor's data bus for performing operations on packed data. This eliminates the need to transfer smaller units of data across the processor's data bus to perform one or more operations one data element at a time.

Still referring to FIG. 1, the computer system 100 of the present invention may include one or more I/O (input/output) devices 120, including a display device such as a monitor. The I/O devices 120 may also include an input device such as a keyboard, and a cursor control such as a mouse, trackball, or trackpad. In addition, the I/O devices may also include a network connector such that computer system 100 is part of a local area network (LAN), intra-net, extra-net or a wide area network (WAN). In addition, the I/O devices 120 includes a device for sound recording, and/or playback, such as an audio digitizer coupled to a microphone for recording voice input for speech recognition. The I/O devices 120 may also include a video digitizing device that can be used to capture video images, a hard copy device such as a printer, and a CD-ROM device, or the like.

Processor

FIG. 2 illustrates a detailed diagram of processor 110, as well as cache processor (CaPro) 400. Processor 110 and CaPro 400 can be implemented on one or more substrates using any of a number of process technologies, such as, BiCMOS, CMOS, and NMOS. Processor 110 comprises a decoder 170 for decoding control signals and data used by processor 110. Data can then be stored in register file 200 via internal bus 190. As a matter of clarity, the registers of an embodiment should not be limited in meaning to a particular type of circuit. Rather, a register of an embodiment need only be capable of storing and providing data, and performing the functions described herein. In one embodiment, CaPro 400 may including a portion of the registers and internal bus of processor 110.

Depending on the type of data, the data may be stored in integer registers 202, registers 210, registers 214, status registers 208, or instruction pointer register 206. Other registers can be included in the register file 204, for example, floating point registers 204. In one embodiment, integer registers 202 store thirty-two bit integer data. In one embodiment, registers 210 contains eight multimedia registers, $R_0$ 212-1 through $R_7$ 212-7, for example, single instruction, multiple data (SIMD) registers containing packed data. In one embodiment, each register in registers 210 is one hundred twenty-eight bits in length. R1 212-1, R2 212-2 and R3 212-3 are examples of individual registers in registers 210. Thirty-two bits of a register in registers 210 can be moved into an integer register in integer registers 202. Similarly, value in an integer register can be moved into thirty-two bits of a register in registers 210.

In one embodiment, registers 214 contains eight multimedia registers, 216-1 through 216-N, for example, single instruction, multiple data (SIMD) registers containing packed data. In one embodiment, each register in registers 214 is sixty-four bits in length. Thirty-two bits of a register in registers 214 can be moved into an integer register in integer registers 202. Similarly, value in an integer register can be moved into thirty-two bits of a register in registers 214. Status registers 208 indicate the status of processor 110. In one embodiment, instruction pointer register 211 stores the address of the next instruction to be executed. Integer registers 202, registers 210, status registers 208, registers 214, floating-point registers 204 and instruction pointer register 206 all connect to internal bus 190. Any additional registers would also connect to the internal bus 190.

In another embodiment, some of these registers can be used for different types of data. For example, registers 210/214 and integer registers 202 can be combined where each register can store either integer data or packed data. In another embodiment, registers 210/214 can be used as floating point registers. In this embodiment, packed data or floating point data can be stored in registers 210/214. In one embodiment, the combined registers are one hundred ninety-two bits in length and integers are represented as one hundred ninety-two bits. In this embodiment, in storing packed data and integer data, the registers do not need to differentiate between the two data types.

Execution unit 130, in conjunction with, for example ALU 180, performs the operations carried out by processor 110. Such operations may include shifts, addition, subtraction and multiplication, etc. Functional unit 130 connects to internal bus 190. In one embodiment, as described above, the system 100 includes the cache processor (CaPro) 400, including data buffer (local cache) 410, while the processor 110 includes one or more second memory buffers (cache) 160. The CaPro 400, as well as the one or more cache memories 160 and local cache 410, can be used to buffer data and/or control signals from, for example, main memory 104. CaPro 400 as well as the cache memories 160 are connected to decoder 170, and connected to receive control signals.

Data and Storage Formats

Figure 3A:
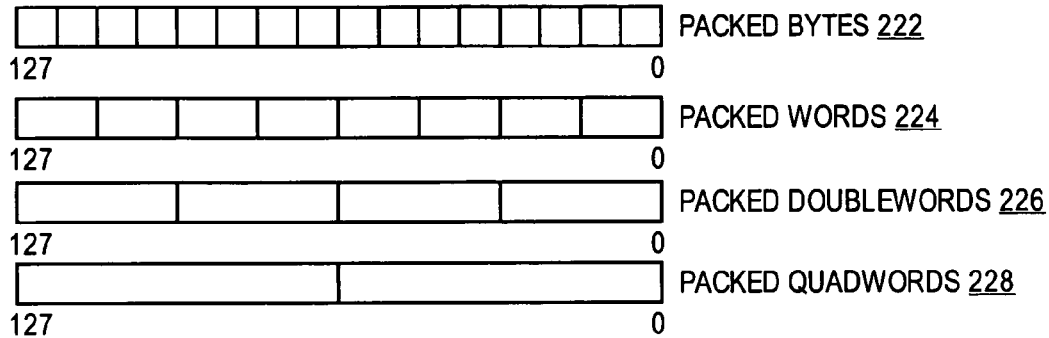
FIGS. 3A and 3B depict block diagrams illustrating 128-bit packed SIMD data types in accordance with one embodiment of the present invention.
Figure 3B:
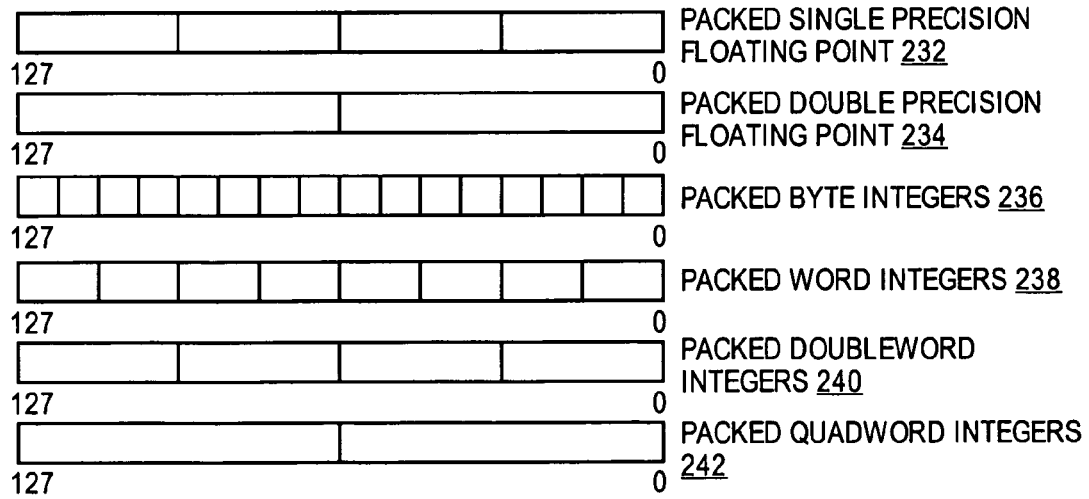

Referring now to FIGS. 3A and 3B, FIGS. 3A and 3B illustrate 128-bit SIMD data type according to one embodiment of the present invention. FIG. 3A illustrates four 128-bit packed data-types 220, packed byte 222, packed word 224, packed doubleword (dword) 226 and packed quadword 228. Packed byte 222 is one hundred twenty-eight bits long containing sixteen packed byte data elements. Generally, a data element is an individual piece of data that is stored in a single register (or memory location) with other data elements of the same length. In packed data sequences, the number of data elements stored in a register is one hundred twenty-eight bits divided by the length in bits of a data element.

Packed word 224 is one hundred twenty-eight bits long and contains eight packed word data elements. Each packed word contains sixteen bits of information. Packed doubleword 226 is one hundred twenty-eight bits long and contains four packed doubleword data elements. Each packed doubleword data element contains thirty-two bits of information. A packed quadword 228 is one hundred twenty-eight bits long and contains two packed quad-word data elements. Thus, all available bits are used in the register. This storage arrangement increases the storage efficiency of the processor. Moreover, with multiple data elements accessed simultaneously, one operation can now be performed on multiple data elements simultaneously.

FIG. 3B illustrates 128-bit packed floating-point and Integer Data types 230 according to one embodiment of the invention. Packed single precision floating-point 232 illustrates the storage of four 32-bit floating point values in one of the SIMD registers 210, as shown in FIG. 2. Packed double precision floating-point 234 illustrates the storage of two 64-bit floating-point values in one of the SIMD registers 210 as depicted in FIG. 2. As described in further detail below, packed double precision floating-point 234 may be utilized to store an entire sub-matrix, utilizing two 128-bit registers, each containing four vector elements which are stored in packed double precision floating-point format. Packed byte integers 236 illustrate the storage of 16 packed integers, while packed word integers 238 illustrate the storage of 8 packed words. Finally, packed doubleword integers 240 illustrate the storage of four packed doublewords, while packed quadword integers 242 illustrate the storage of two packed quadword integers within a 128-bit register, for example as depicted in FIG. 2.

Figure 3C:
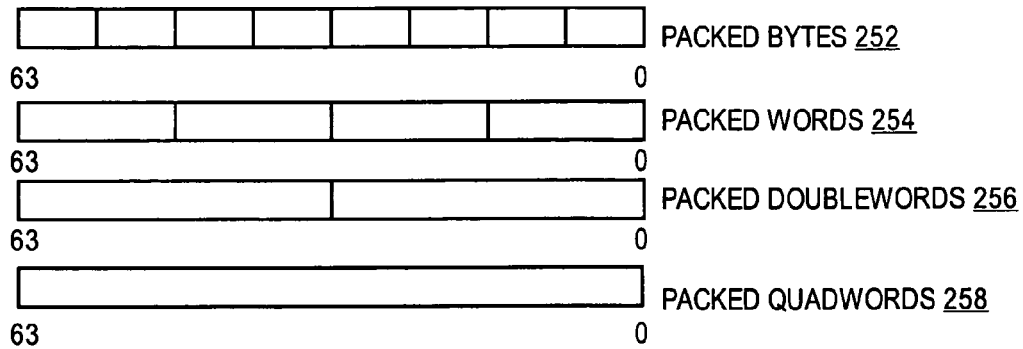
FIGS. 3C and 3D depict block diagrams illustrating 64-bit packed SIMD data types in accordance with a further embodiment of the present invention.
Figure 3D:
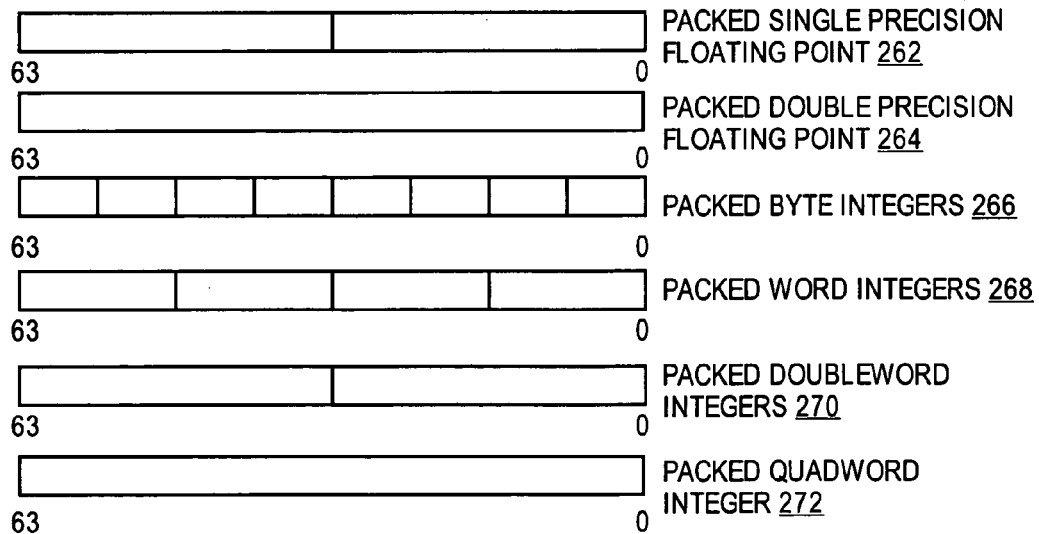

Referring now to FIGS. 3C and 3D, FIGS. 3C and 3D depict blocked diagrams illustrating 64-bit packed single instruction multiple data (SIMD) data types, as stored within registers 214, in accordance with one embodiment of the present invention. As such, FIG. 3C depicts four 64-bit packed data types 250, packed byte 252, packed word 254, packed doubleword 256 and packed quadword 258. Packed byte 252 is 64 bits long, containing 8 packed byte data elements. As described above, in packed data sequences, the number of data elements stored in a register is 64 bits divided by the length in bits of a data element. Packed word 254 is 64 bits long and contains 4 packed word elements. Each packed word contains 16 bits of information. Packed doubleword 256 is 64 bits long and contains 2 packed doubleword data elements. Each packed doubleword data element contains 32 bits of information. Finally, packed quadword 258 is 64 bits long and contains exactly one 64-bit packed quadword data element.

Referring now to FIG. 3D, FIG. 3D illustrates 64-bit packed floating-point and integer data types 260, as stored within registers 214, in accordance with a further embodiment of the present invention. Packed single precision floating point 262 illustrates the storage of two 32-bit floating-pint values in one of the SIMD registers 214 as depicted in FIG. 2. Packed double precision floating-point 264 illustrates the storage of one 64-bit floating point value in one of the SIMD registers 214 as depicted in FIG. 2. Packed byte integer 266 illustrates the storage of eight 32-bit integer values in one of the SIMD registers 214 as depicted in FIG. 2. Packed doubleword integer 270 illustrates the storage of two 32-bit integer values in one of the SINM registers 214 as depicted in FIG. 2. Finally, packed quad-word integer 272 illustrates the storage of a 64-bit integer value in one of the SIMD registers 214 as depicted in FIG. 2.

Conventional Image Block Processing

Figure 4:
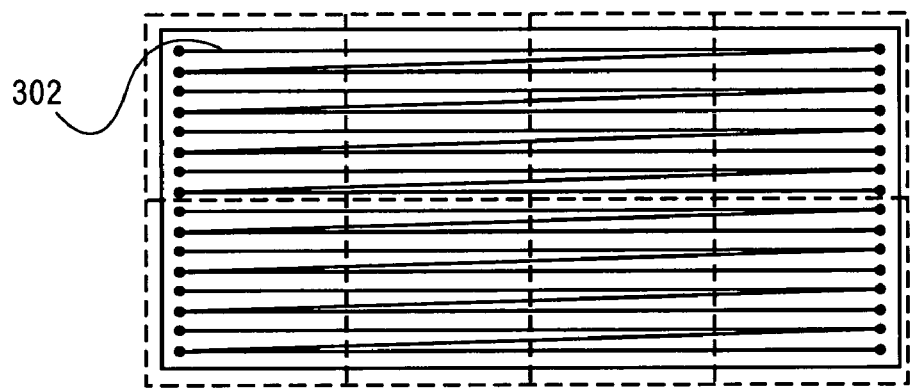
FIG. 4 depicts a block diagram illustrating a conventional raster scan memory arrangement as known in the art.

Current raster-scan memory arrangement 300 for image/video applications place pixel data 302 across image planes in a linear fashion, as depicted in FIG. 4. As a result, in the conventional raster scan memory arrangement 300, a cache line typically holds some parts of several basic image blocks (e.g., 8×8 or 16×16). For example, a cache line could hold one line for four separate basic image blocks. On the other hand, a basic image block is typically contained in multiple cache lines. That is, a single basic block could be contained in, for example, eight separate cache lines.

Data Access According to a Memory Access Pattern

Figure 5:
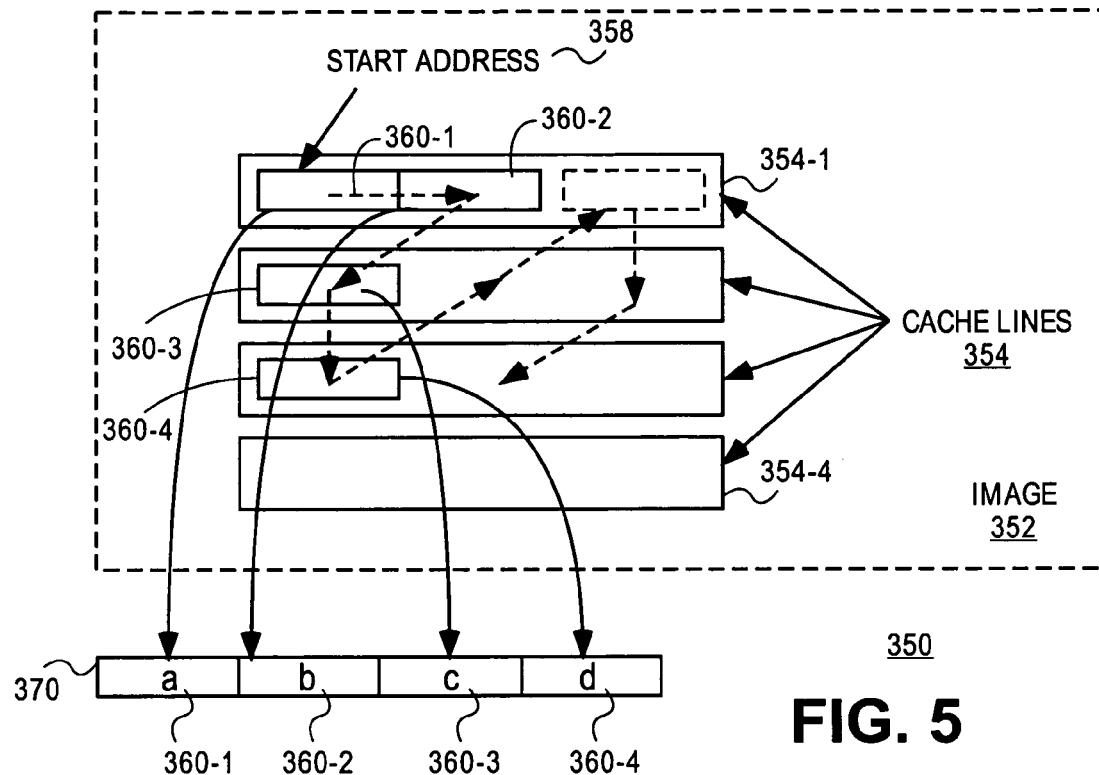
FIG. 5 depicts a block diagram illustrating memory read operation according to a memory access pattern in accordance with one embodiment of the present invention.

Referring now to FIG. 5, FIG. 5 depicts a block diagram 350 illustrating a memory read operation according to a memory access pattern in accordance with one embodiment of the present invention. As illustrated, an image 352 includes an image block, which is comprised of cache lines 354 (354-1, . . . , 354-4). In order to process the image, the present invention describes memory-access (CP-Load) operations/instructions which enable vertical reading/writing of data according to a memory access pattern within each of the cache/memory lines into a destination data storage device 370. Such an operation is performed in response to a single instruction in contrast to conventional memory operation instructions.

In order to support memory-access according to a memory access pattern (as depicted in FIG. 5) by, for example, a CPU, new instructions are provided as illustrated in FIG. 1. In one embodiment, a new instruction looks like the following:

CPMOV[B|W|D]2[Q|DQ] [MMX|XMM], pattern_map, start_addr, offset

As illustrated in FIG. 5, the effect of the new instructions, say, CPMOVW2Q MM0, start_addr, pitch, is the following:

$$MM0[0 \ldots 15] \leftarrow [\text{start\_addr} + \text{pattern\_map[offset]}] \quad (1)$$

$$MM0[16 \ldots 31] \leftarrow [\text{start\_addr} + \text{pattern\_map} + [\text{offset}]] \quad (2)$$

$$MM0[32 \ldots 47] \leftarrow [\text{start\_addr} + \text{pattern\_map[offset]} + *2] \quad (3)$$

$$MM0[48 \ldots 63] \leftarrow [\text{start\_addr} + + \text{pattern\_map[offset]} + *3] \quad (4)$$

In one embodiment, the implementation of the CP load operation is performed utilizing CaPro 400, utilizing local cache 410 to hide data access time when accessing data according to random/various memory access patterns. In other words, CaPro 400 accesses the requested data according to a memory access pattern and sequentially stores the data within a destination data storage device, such as a register, for example, as depicted in FIGS. 3A–3D. In an alternative embodiment, the CP-Load instructions/operations could specify the local cache as the destination device. According to this embodiment, CaPro 400 notifies CPU 110 once the requested data is available for sequential memory access thereof by CPU 110.

Accordingly, as illustrated by operations 1–4, the instruction parameter MM0 refers to, for example, the destination data storage device 370, as depicted in FIG. 5. As described with reference to FIG. 1, the CPMOV operations support byte, word and doubleword non-horizontally sequential memory reads. However, those skilled in the art will appreciate that the embodiments of the present invention may be applied to any variation of byte multiples. Accordingly, the CPMOV operation is provided as, for explanatory purposes, and it should not be interpreted in a limiting sense.

As such, move operations 1–4 are implemented in response to a single CPMOV operation. In addition, the parameters 2Q and 2DQ within the CPMOV operation, direct the loading of a data block within the local cache 410 when a cache miss of data requested by an CP load operation is detected. Accordingly, in one embodiment, when dealing with the byte data, the parameter 2Q requires the loading of an 8-byte by 8-line block of data within a corresponding portion of an CP cache memory 410. In addition, when the 2DQ parameter is supplied, an 8-byte by 16-line block is loaded within a corresponding portion of the CP cache memory 410.

When dealing with word data, the 2Q parameter requires the loading of an 8-byte by 4-line block within the local cache 410, while the 2DQ parameter requires the loading of an 8-byte by 8-line block of data. Finally, when dealing with doubleword data, the 2Q parameter requires the loading of an 8-byte by 2-line block, while the 2DQ parameter requires the loading of an 8-byte by 4-line block. Accordingly, assuming the CP move operation as described above, if a cache miss of the requested data is detected, the operation performed would be as follows:

$$\text{local Cache} \leftarrow [\text{astart\_addr}][0 \ldots 63] \quad (5)$$

$$\text{local Cache} \leftarrow [[\text{astart\_addr+offset}][0 \ldots 63] \quad (6)$$

$$\text{local Cache} \leftarrow [[\text{astart\_addr+offset*2}][0 \ldots 63] \quad (7)$$

$$\text{local Cache} \leftarrow [\text{astart\_addr+offset*3}][0 \ldots 63] \quad (8)$$

into the CP Cache, where aligned start address (astart_addr) =(start_addr & (~7)). Alternatively, in one embodiment, the data block may be selected according to the memory access pattern to determine the minimum dimension of an image block containing the requested data.

Cache Processor—CaPro

Figure 6:
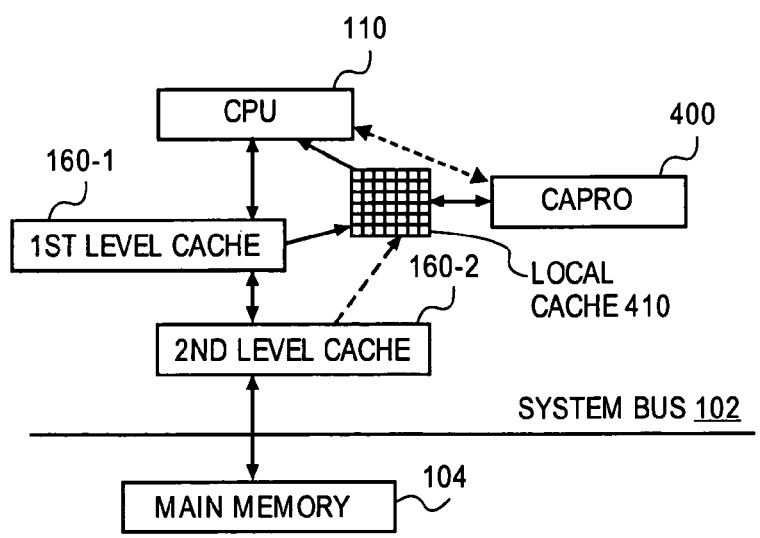
FIG. 6 depicts a block diagram further illustrating the computer system, as depicted in FIGS. 1 and 2, utilizing a cache processor, in accordance with a further embodiment of the present invention.

Referring now to FIG. 6, FIG. 6 further illustrates the computer system 100, as depicted in FIG. 1, in accordance with an embodiment utilizing a cache processor (CaPro) 400 for implementing CP load operations as described above. The CaPro 400, as illustrated, includes local cache 410, capable of storing bit and byte multiple data. In one embodiment, the local cache 410 is sub-divided into a byte buffer, a word buffer and a doubleword buffer. However, those skilled in the art will appreciate that the local cache memory 410 may be implemented using various byte multiples as its various data buffers. Accordingly, FIG. 6 is provided for explanatory purposes only and should not be construed in a limiting sense. In one embodiment, the cache 410 is referred to as a local data buffer, while the level one cache 160-1 and the level two cache 160-2 are referred to as one or more memory buffers.

In the embodiment depicted in FIG. 6, CPU 110 may require cache data according to a non-horizontally/non-vertically sequential access pattern. As such, in accordance with one embodiment of the present invention, CPU 110 will determine the desired access pattern, and along with a CP load instruction, transmit the access pattern (or reference thereto) and load instruction to cache processor 400. In turn, cache processor 400 will gather the desired data from either level 1 (L1) cache 160-1, second level cache (L2) 160-2 or main memory 104.

Once the desired data is gathered, CaPro 400 reorganizes the desired data to enable CPU 110 to access the desired data utilizing traditional sequential memory access. However, in the embodiments depicted, local cache 410 is configured as a read only cache for CPU 110. As such, CPU 110 is generally limited to reading of data from local cache 410, whereas data writes performed by CPU 110 are performed within and limited to L1/L2 cache 160 and main memory 104. In contrast, CaPro 400 will read and write desired data within local cache 410, as dictated by received memory access patterns, as well as CP load instructions.

Figure 7A:
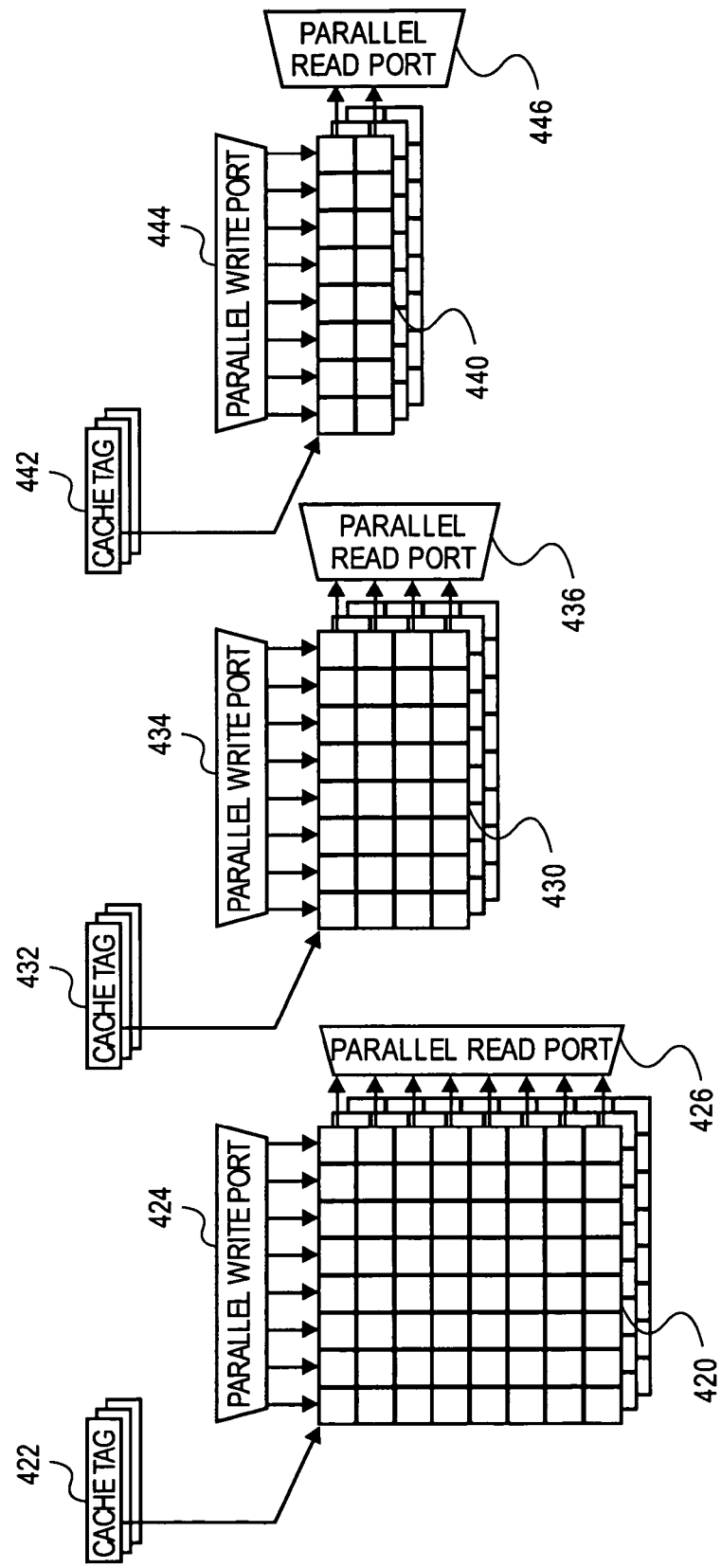
FIGS. 7A and 7B depict block diagrams further illustrating the cache processor (CaPro), in accordance with a further embodiment of the present invention.

Referring now to FIG. 7A, FIG. 7A further illustrates the local cache memory 410, as depicted in FIG. 6, in accordance with a further embodiment of the present invention. As illustrated, the data buffers (420, 430 and 440) of the local cache 410, each including a respective cache tag (422, 432 and 442) for determining a cache hit or miss of requested data within the respective data buffer. In addition, each data buffer includes a parallel write port (424, 434 and 444), as well as a parallel read port (426, 436 and 446). In one embodiment, the parallel read/write ports are utilized by CaPro 400 to load data according to a memory access pattern, and organize the data to enable sequential access of the data by CPU 110 within a selected destination data storage device.

Figure 7B:
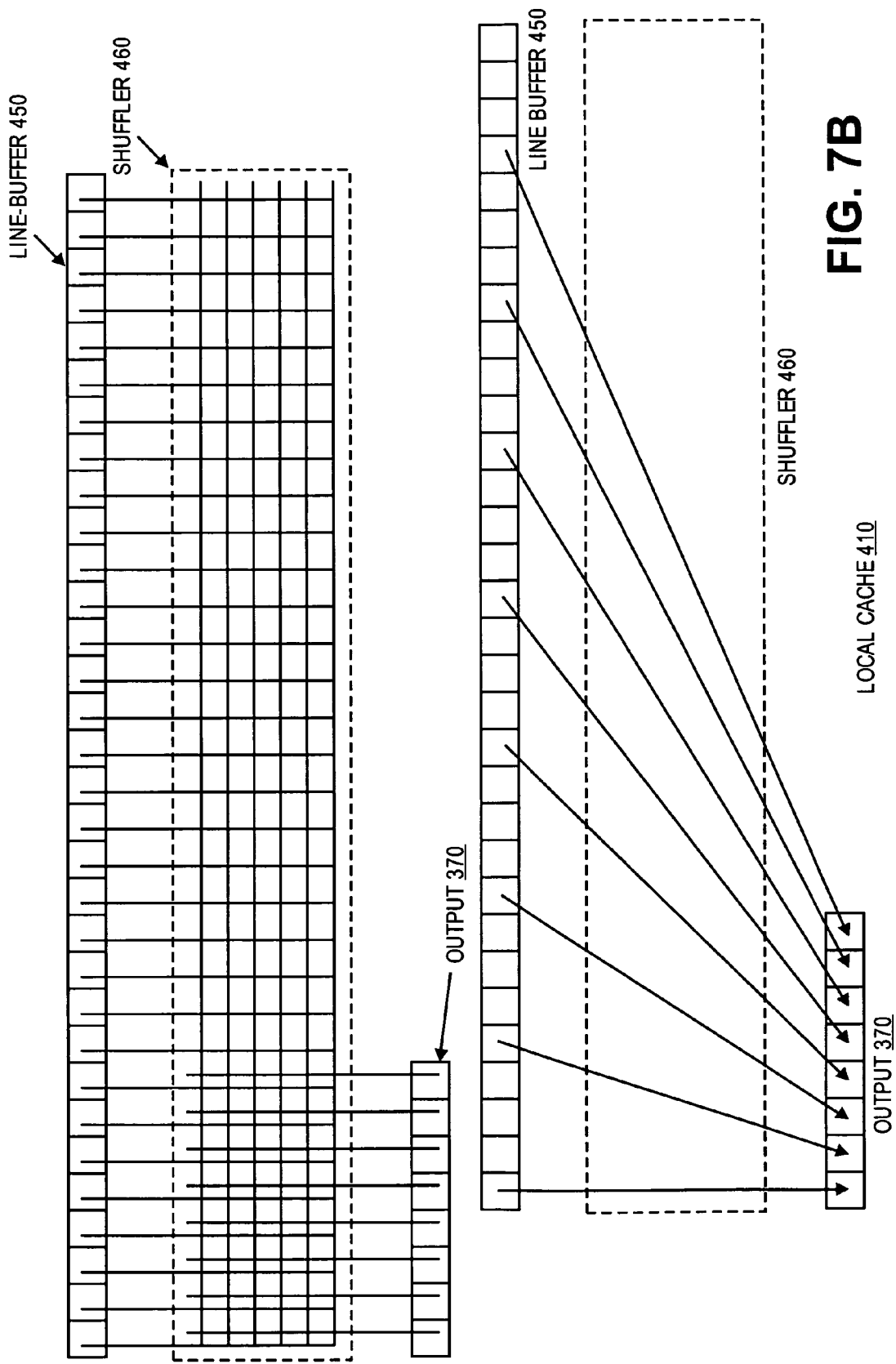

Referring now to FIG. 7B, FIG. 7B depicts an alternate embodiment of the local cache memory 410 illustrates a line buffer 450, as well as a data shuffler 460, utilized by CaPro 400 to generate respective output data 370. As illustrated, the line buffer 450 is used to hold the data while the shuffler/crossbar 460 is used to gather the scattered data. Once gathered, the data is placed in output 370. Alternatively, CaPro 400 sends a signal to CPU 110 once the data is placed in a sequential order to enable access thereof.

Although the local cache 410, as depicted in FIGS. 7A and 7B, utilizes memory transpose circuitry (FIG. 7A) or a line buffer 440 and shuffler 450 (FIG. 7B), those skilled in the art will recognized that various other means are encompassed by the present invention for implementing memory access according to received memory access patterns from a cache memory, as taught by the present invention. Accordingly, the embodiment described should not be interpreted in a limiting sense since the various embodiments are provided as one possible implementation of the present invention.

As such, utilizing a cache processor 400, memory access time is hidden from CPU 110 when accessing data in response to CP load operations specifying a memory access pattern. In doing so, the computer system 100 may be utilized to perform image and video processing operations in an improved and efficient manner beyond conventional computer systems. In one embodiment, CaPro 400 will load data according to the requested memory access pattern within a destination data storage device, such as, for example, a register. Alternatively, CaPro 400 will organize the requested data within local cache 410. Accordingly, based on the indicated embodiment, CaPro 400 will signal CPU 110 once the requested data is organized to enable sequential memory access of the data. As such, once the signal is provided from CaPro 400, CPU 110 may access the requested data using traditional sequential memory access.

As described above, utilizing the CP load operations as well as CaPro 400, the embodiments of the present invention can shield CPU 110 from memory access time required for accessing data according to random memory access patterns required by, for example, video/image processing operations. Hence, image video processing/coding operations are simplified by utilizing non-horizontally/non-vertically sequential memory access, such as for example, reading data from an image block in a zig-zag scan order, as illustrated in FIG. 5. Various image processing/coding operations may be implemented according to embodiments of the present invention, for example, as depicted in FIGS. 8A and 8B.

Figure 8A:
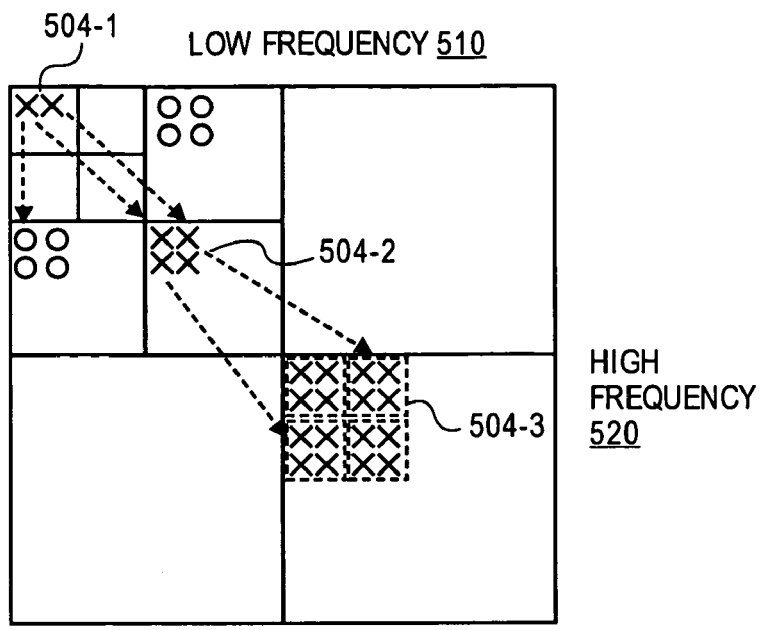
FIG. 8A depicts a block diagram illustrating a zerotree coding data access pattern in accordance with one embodiment of the present invention.

FIG. 8A depicts a block diagram illustrating zerotree coding 500 required to perform wavelet transform based image coding within, for example, JPEG 2000. As illustrated, the required data access cannot be efficiently performed utilizing traditional horizontally sequential memory access (FIG. 4). However, utilizing CaPro 400, the required zero tree data 504 (504-1, 504-2 and 504-3) can be efficiently accessed utilizing the non-vertically/non-horizontally sequential memory access according to the CP load operations. Accordingly, CPU 110 can determine a memory access pattern (as indicated by the arrows) to gather the low frequency 510 and high frequency zero tree data 504. In response to the CP load operation and received reference access pattern, CaPro 400 shields the CPU 110 from memory access time required for accessing data according to the zero tree coding 500. Once accessed, CaPro 400 organizes the data to enable sequential access thereof by CPU 110.

Figure 8B:
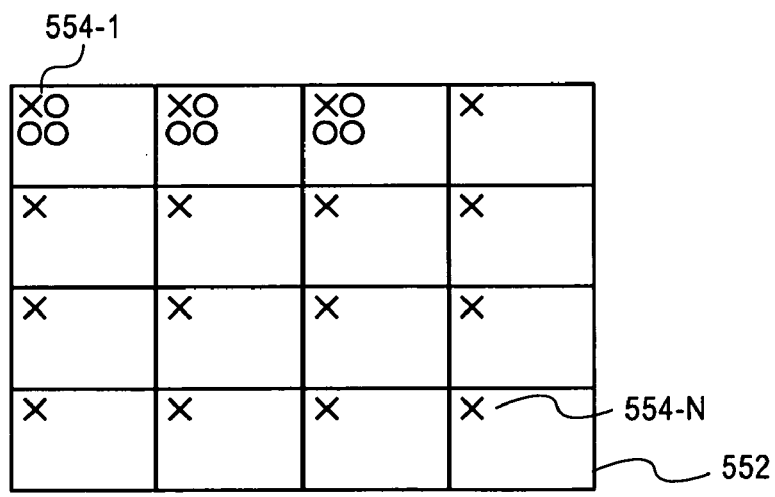
FIG. 8B depicts a block diagram illustrating a bit plane extraction data access pattern in accordance with one embodiment of the present invention.

Referring now to FIG. 8B, FIG. 8B depicts a block diagram illustrating an image 552 in which bit plane extraction 550 is required to perform wavelet image encoding and decoding. As illustrated, bit plane extraction requires accessing of the bit plane data 554 (554-1, . . . , 554-N), which cannot be accessed utilizing traditional horizontally sequential memory access (FIG. 4). However, in accordance with the embodiments of the present invention, a memory access pattern may be devised by CPU 110, such that utilizing the CP load operations, as well as CaPro 400, as depicted in FIG. 6, the various bit plane data 554 may be efficiently accessed. Accordingly, utilizing the CP load instructions, as well as CaPro 400, memory access required for bit plane extraction during wavelet imaging coding and decoding is shielded from the CPU 110 by utilizing the non-horizontally/non-vertically sequential memory access provided in accordance with the embodiments of the present invention.

Cache Coherence:

In one embodiment, a subset of the MESI (modified (M), exclusive (E), shared (S) and invalid (I)) cache line states, S and I, are implemented by the CaPro 400, assuming the embodiment described does not support CP-Write operation. In the event of CP-Load misses, the CaPro issues a request to L1/L2 cache 160. A lookup is performed in the L1/L2 cache 160, resulting in a hit or a miss. If a hit is detected, the CaPro 400 retrieves the block. The block of data is placed in the local cache 410 with the S state. If the request results in a cache miss, the CaPro 400 may issue a request to the external bus interface and the block of data is read from external memory 104 or external data buffers (not shown).

During the transaction's snoop phase, other caches report whether or not they have a copy of the data block. If any external cache has a copy in the M state, the line is supplied from that cache and is placed in the L1/L2 cache 160 and local cache 410 in the S state. At the same time when the M block of data is supplied to local cache 410, the block of data is written into memory 104. The block of data in the external cache is therefore no longer different than memory 104.

As such, a state of the block of data transitions from the M to the S state. When no other cache has a copy (snoop miss) or any other cache (external cache) has a copy in the E or S state, the block of data is read from memory 104. The L1/L2 cache 160 and the local cache 410 place their copies in the S state upon completing the data block read from memory 104. Any other cache has a copy, the block of data is also in the S state. Accordingly, CaPro 400 maintains data coherency within the system 100. In the embodiment described, CPU 110 is not responsible for maintaining coherency of local cache 410, since CPU 110 does not write to local cache 410.

Figure 9:
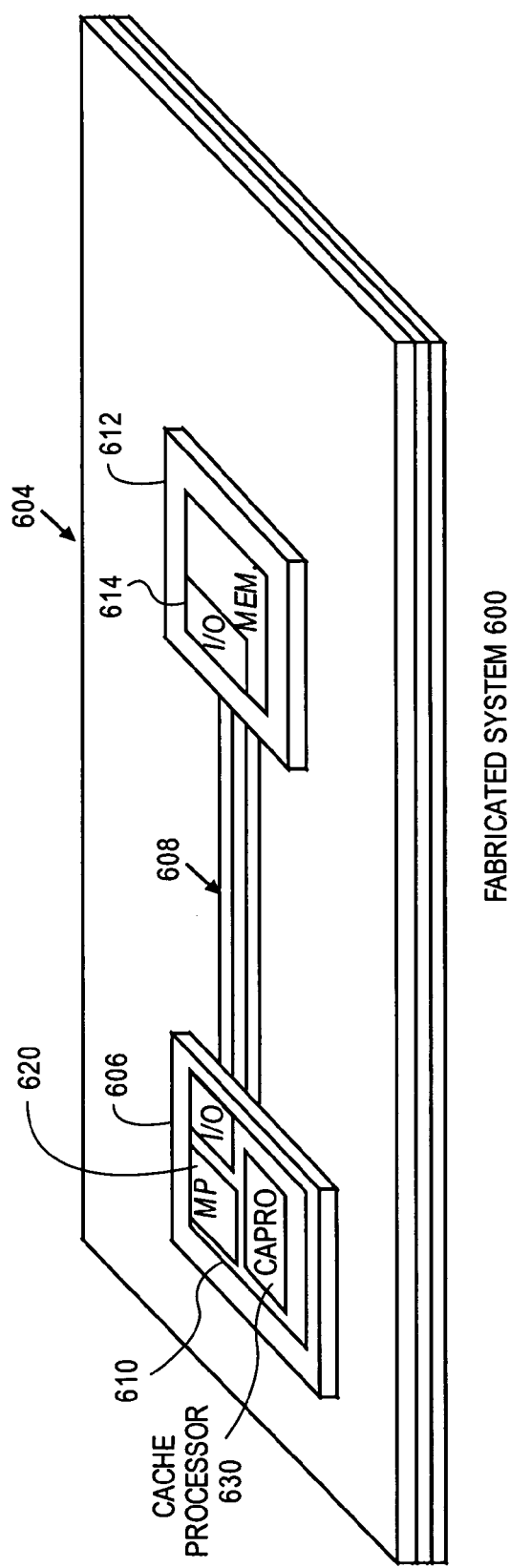
FIG. 9 depicts a fabricated system of a computer system, as depicted in FIGS. 1, 2 and 6, in accordance with one embodiment of the present invention.

Turning now to FIG. 9, what is shown is a block diagram of an embodiment of an electronic system 600 in which a processor features the CaPro 400 as well as local cache memory as described above. The system includes a multi-layer printed wiring board 604 on which a parallel bus 608 is formed. The bus 608 may be of the point to point variety, or a multi-drop bus such as those used in a main memory. Alternatively, the bus 608 may be implemented utilizing optical signals between the various chip packages where optical/electrical conversion is required. An integrated circuit (IC) chip package 606 is operatively installed on the board to communicate using the parallel bus 608. The installation of the package 606 may be done by a surface mount technique or via a connector or socket.

In addition, the package has an IC chip 610 that includes a logic function section, and an I/O section as an interface between the logic function section and the bus 608. In one embodiment, the logic function is a microprocessor, including the CaPro 400 and local cache 410 memory, as described above. Alternatively, other devices that can be implemented in the logic function section of an IC chip may be used such as a memory controller, and a bus bridge. The I/O section has a bus receiver in which an equalization loop as described above is provided.

A second IC package 612 is also installed on the board 604 to communicate with the first package 606 via the bus 608. The second IC package 612 also includes a chip 614 having an I/O section in which a bus receiver is provided to interface the bus 608, and its own logic function section (here shown as a memory controller). Those skilled in the art will recognize that fabricated system 600 is provided for illustration purposes and should not be interpreted in a limiting sense. Moreover, the various IC packages may be embodied within separate boards or combined as required by specific implementation details. Furthermore, communication between the various components is not limited to electrical signals and includes optical communication, micro-electro mechanical communication signals or the like.

According to an embodiment, microprocessor (MP) 620 utilizes a cache processor (CaPro) 630, as described above. Thus, in such an embodiment, CaPro 630 hides memory access time from MP 620 when accessing data according to a memory access pattern in response to a single CP load instruction. Other system applications of the cache processor 630 are possible, including, for example, a memory controller.

Accordingly, the computer system 100 depicted in FIGS. 1 and 2 does not suffer from the problems described above with reference to conventional graphics applications. By using a cache processor 400, the processor 110 is able to read/write data according to special/memory access pattern required by current image/video processing/coding algorithms. In addition, the cache processor 400 avoids excessive data access time suffered by conventional cache memories when processing image data according to special memory access patterns. Procedural methods for implementing the embodiments of the present invention are now described.

Operation

Figure 10:
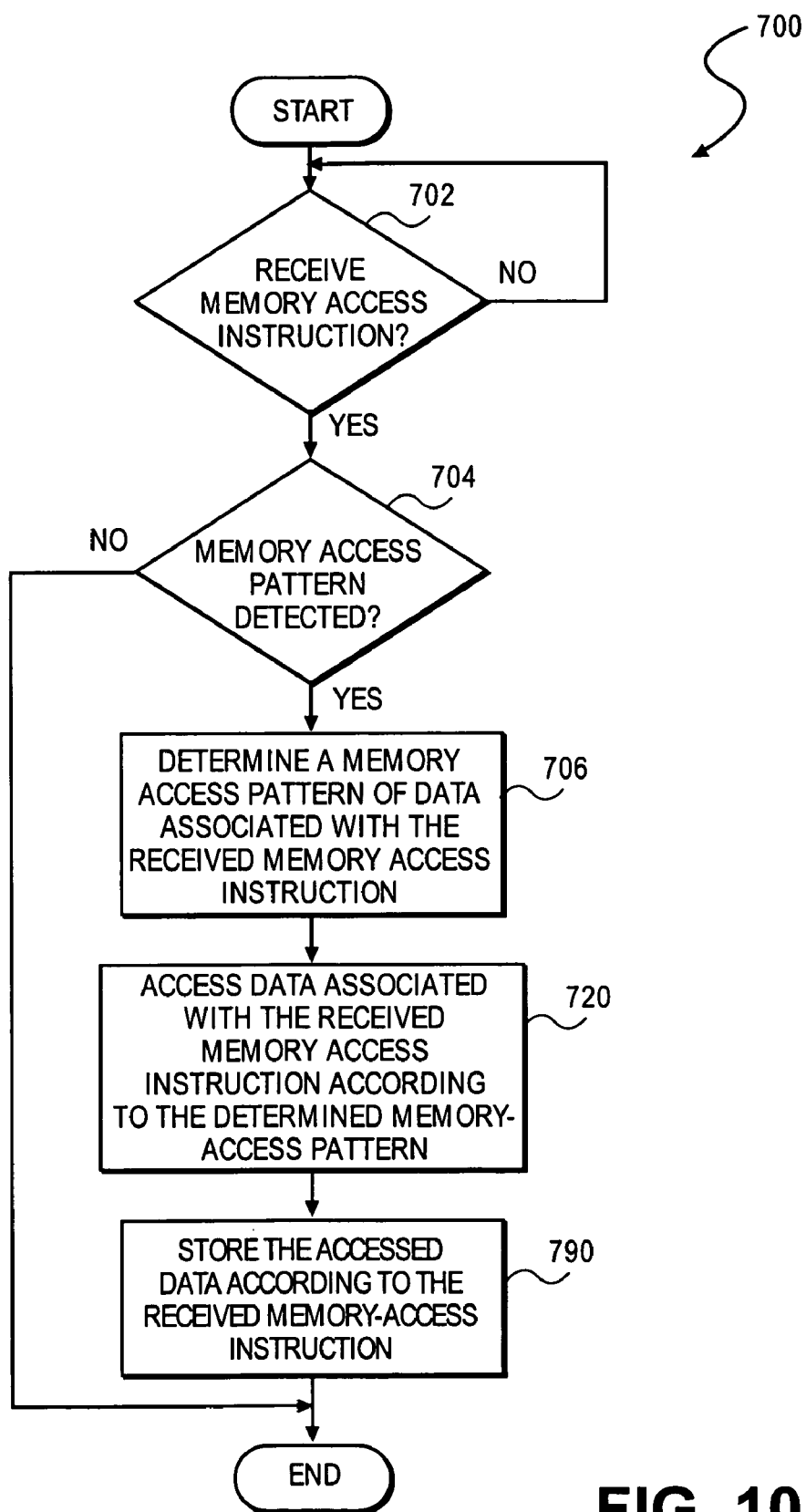
FIG. 10 depicts a flowchart illustrating a method for accessing data in accordance with a received memory access pattern according to one embodiment of the present invention.

Referring now to FIG. 10, FIG. 10 depicts a flowchart illustrating a method 700 for accessing data according to a random memory access pattern from a local data buffer, such as the local cache memory 410 of the cache processor 400 of computer system 100, depicted in FIGS. 1, 2, 6 and 9. At process block 702, it is determined whether a CP memory-access instruction is received. The CP memory-access instructions include, for example, but are not limited to, the CPMOV instructions (142–158), as depicted in FIG. 1. Once a CP memory-access instruction is received, process block 704 is performed.

At process block 704, it is determined whether a memory access pattern is detected. As described in the embodiments above, the memory access pattern indicates memory access according to a group of data addresses and offsets as indicated by the memory access pattern pointer. The memory access patterns may include, but are not limited to, zig-zag memory access patterns (as depicted in FIG. 5), zerotree coding memory access patterns (FIG. 8A), bit plane extraction memory access patterns (FIG. 8B), fine granularity scalability access patterns or the like.

Furthermore, as described in the embodiments above, when such a memory access pattern is detected, the cache processor 400 shields the CPU 110 from the memory access time required to access data according to the memory access pattern. The access patterns vary depending on the video or image coding operation, which is required, such as for example, discreet cosine transform, JPEG 2000 bit plane extraction, and MPEG4 fine granularity scalability, or the like. As a result, the CPU 110 is left to focus on other portions of the image/video processing operations.

Next, at process block 706, a memory access pattern of data associated with the received memory access instruction is determined, As described in the embodiments above, the memory access pattern may function as a pointer to an address location in memory containing a list of addresses and offsets of the data which comprises the memory access pattern. Accordingly, once these data addresses and offsets are determined, at process block 720 the cache processor 410 will access data associated with the received memory access instruction according to the determined memory access pattern. Finally, at process block 790, the cache processor stores the accessed data according to the received memory access instruction, which in one embodiment would require the cache processor to store the accessed data within data storage devices of the CPU 110 and modify CPU 110 once the data is accessible using sequential memory access.

Figure 11:
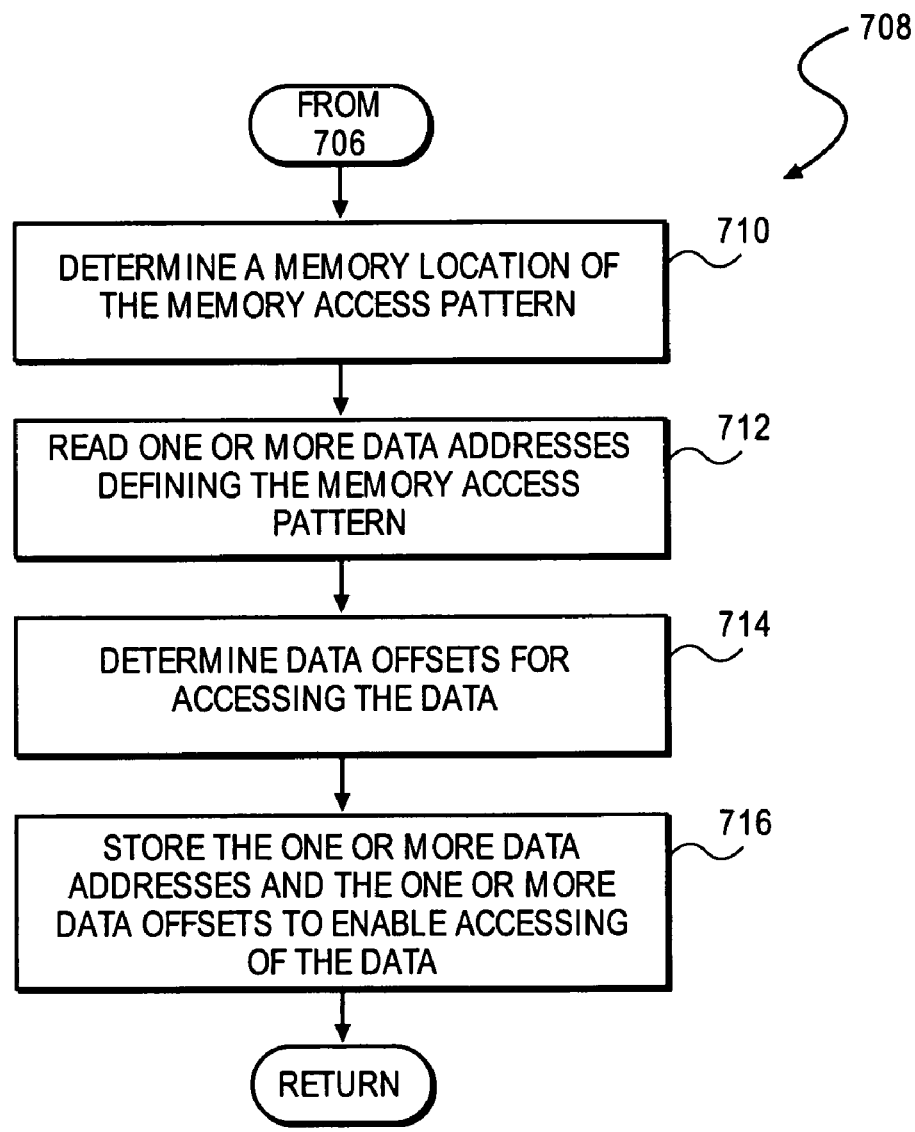
FIG. 11 depicts a flowchart illustrating an additional method for determining a memory access pattern of a received memory access instruction in accordance with the further embodiment of the present invention.

Referring now to FIG. 11, FIG. 11 depicts a flowchart illustrating an additional method 708 for determining data addresses and data offsets for accessing data according to the determined memory access pattern as performed by CaPro 410, as depicted in FIG. 6. At process block 710, the cache processor 400 determines a memory location of the memory access pattern. In one embodiment, the memory access pattern functions as a pointer to a memory location, which contains data addresses and offsets which define the data comprising the memory access pattern. Once the memory location is determined, at process block 712, the cache processor 400 reads one or more data addresses defining the memory access pattern. Next, at process block 714, the cache processor determines data offsets for accessing the data associated with the received memory access instruction. Finally, at process block 716, the cache processor stores the one or more data addresses in the one or more data offsets to enable accessing of the data according to the memory access pattern.

Figure 12:
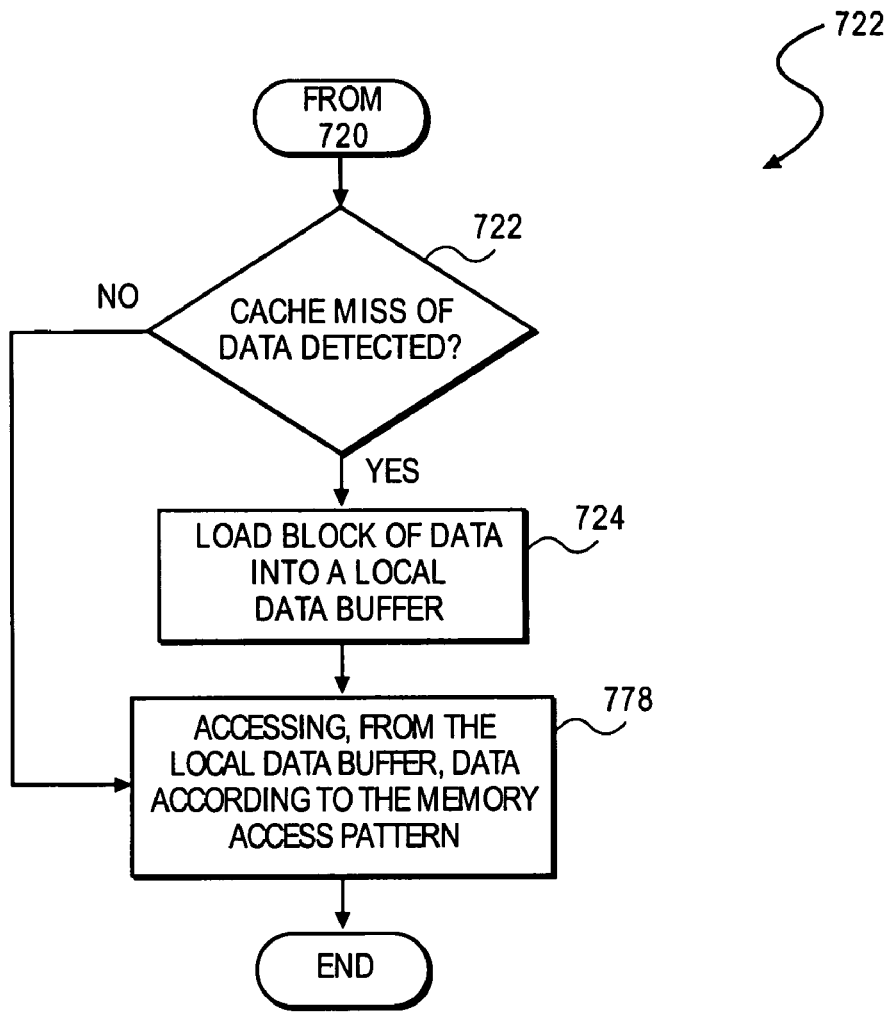
FIG. 12 depicts a flowchart illustrating an additional method for accessing data according to a received memory access pattern according to one embodiment of the present invention.

Referring now to FIG. 12, FIG. 12 depicts a flowchart illustrating an additional method 722 for accessing data of process block 720, as depicted in FIG. 10, for example from local cache 410, as depicted in FIG. 6. At process block 724, it is determined whether a cache miss of data requested by the memory-access instruction is detected. When a cache miss is detected, at process block 724, a block of data is loaded within the local data buffer 410. The size of the block of data, in accordance with one embodiment, is determined by the 2DQ/2Q parameter of the CPMOV operations, as depicted in FIG. 1. Accordingly, depending on the data type of the CPMOV operation, a data block containing the data associated with the memory-access instruction will be loaded within the local cache 410. Finally, at process block 778, the cache processor 400 accesses data from the local data buffer 410 according to the memory access pattern.

Figure 13:
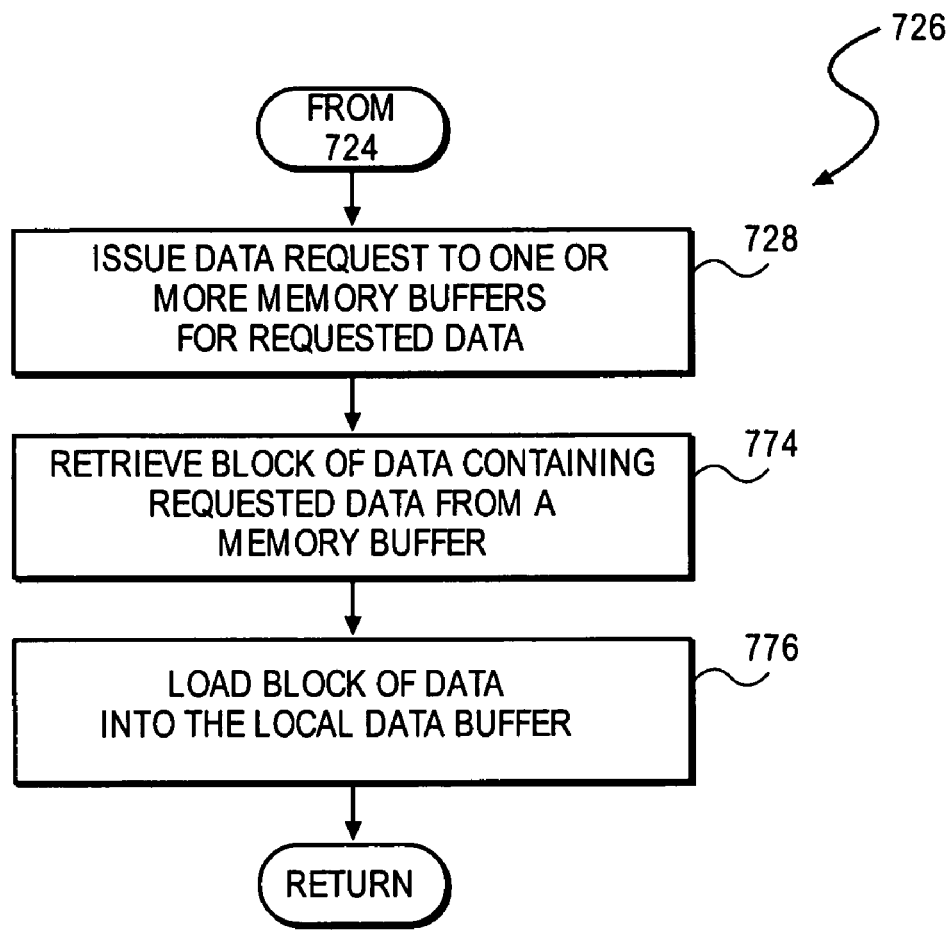
FIG. 13 depicts a flowchart illustrating an additional method for loading a block of data into a local data buffer in accordance with the further embodiment of the present invention.

Referring now to FIG. 13, FIG. 13 depicts a flowchart illustrating an additional method 726 for loading a block of data within the local data buffer of process block 724, as depicted in FIG. 12. At process block 728, the cache processor 400 issues a data request to one or more memory buffers 160. As depicted with reference to FIG. 6, the cache processor 400 would issue a data request to both the level one cache 160-1 and the level two cache 160-2.

Next, at process block 772, the cache processor 400 retrieves the block of data containing the requested data from a memory buffer 160-1 of the one or more memory buffers 160. As described, the one or more memory buffers refer to the level one cache 160-1 and the level two cache 160-2 of the computer system 100, as depicted in FIG. 6. Finally, at process block 774, the block of data is loaded into the local cache 410 by the cache processor, interchangeably referred to herein as a co-processor 400 or CaPro 400.

Figure 14:
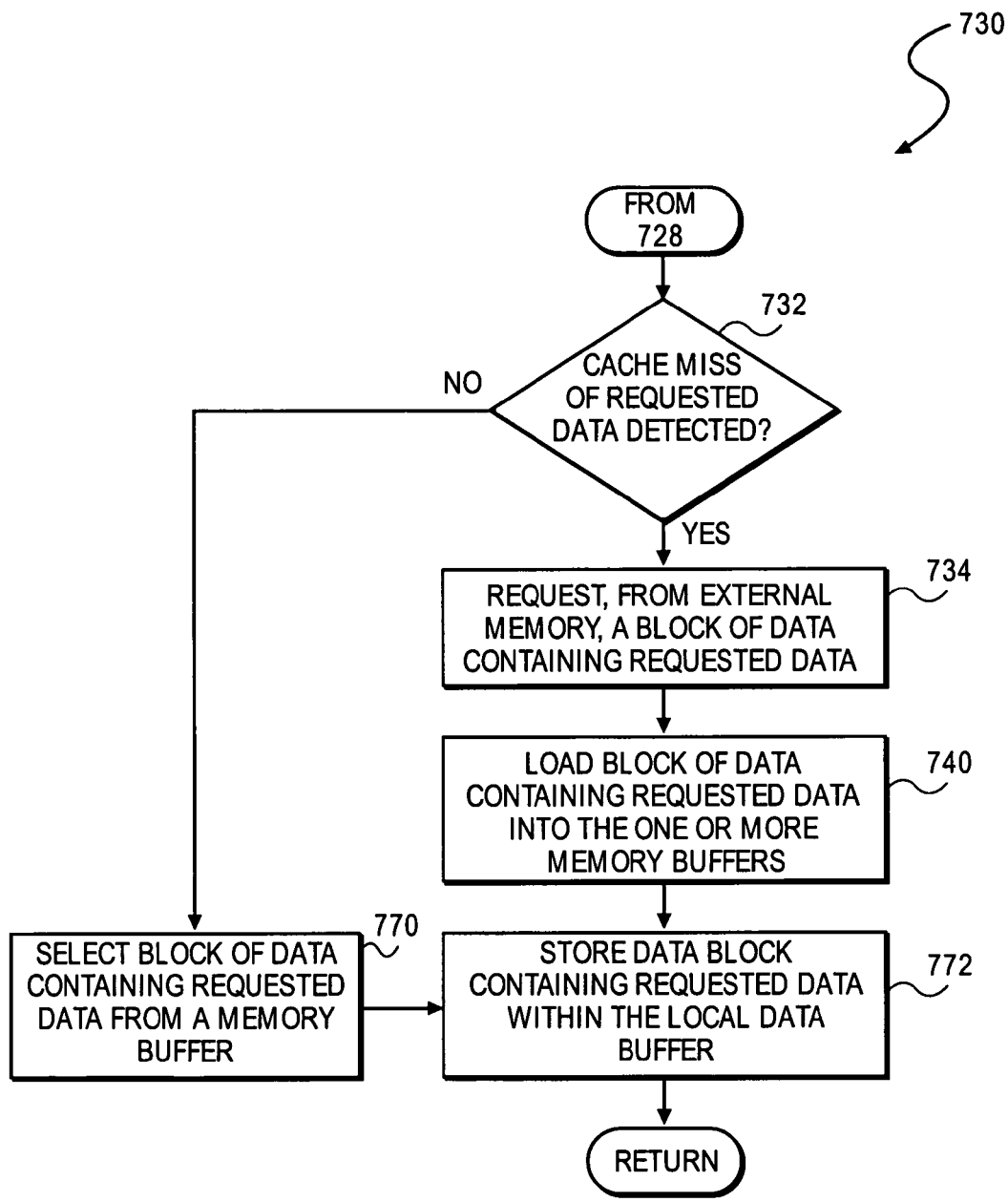
FIG. 14 depicts a flowchart illustrating an additional method for issuing a data request to one or more memory buffers following a local cache miss according to one embodiment of the present invention.

Referring now to FIG. 14, FIG. 14 depicts a flowchart illustrating an additional method 730 for issuing the data request of process block 728, as depicted in FIG. 13. At process block 732, it is determined whether a cache miss of data associated with the memory-access instruction is detected. When a cache miss is detected, process block 732 is performed. Otherwise, process block 770 is performed. At process block 730, CaPro 400, for example, requests, from an external memory 104, a block of data containing the data associated with the memory-access instruction. In one embodiment, as illustrated with reference to FIG. 6, the CaPro 400 requests a block of data from main memory 104.

At process block 740, the block of data containing the requested data is loaded into the one or more memory buffers 100, for example, level one cache and level two cache 160, as depicted in FIG. 6. However, when a cache hit is detected within the one or more memory buffers 160, the block of data is retrieved from a memory buffer containing the requested data. Finally, at process block 772, the data block containing the requested data is stored into the local data buffer, for example, local cache memory 410.

Figure 15:
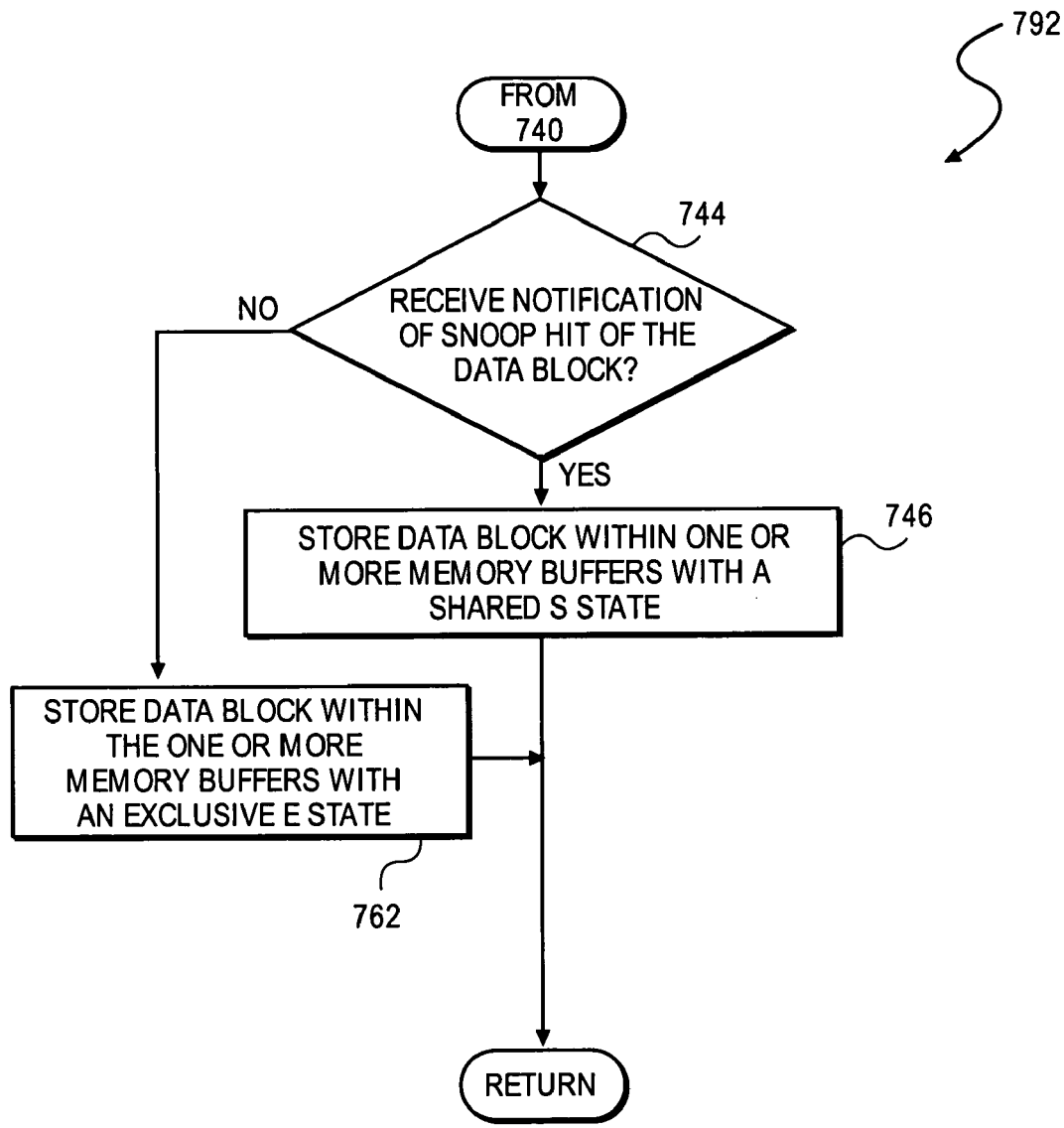
FIG. 15 depicts a flowchart illustrating an additional method for loading a block of data containing requested data in accordance with the further embodiment of the present invention.

Referring now to FIG. 15, FIG. 15 depicts a flowchart illustrating an additional method 742 for maintaining cache coherency within the one or more memory buffers 160, as well as the local cache memory 410 and external memory 104. Accordingly, in one embodiment, the method 792 illustrates performance of cache coherency within the level one cache 160-1, the level two cache 160-2, the local cache 410 and main memory 104 of computer system 100, as depicted in FIG. 6. At process block 744, it is determined whether notification of a snoop hit of the requested data block is received.

Accordingly, when notification of a snoop hit is received, process block 746 is performed. Otherwise, process block 762 is performed. At process block 746, the data block is stored within the one or more memory buffers, with a shared S state, such as for example, level, one cache 160 and level two cache 160, as depicted in FIG. 6. Otherwise, at process block 762, the data block is stored within the one or more memory buffers 160 with an exclusive E state. Once stored, control flow returns to process block 740, as depicted in FIG. 14.

Figure 16:
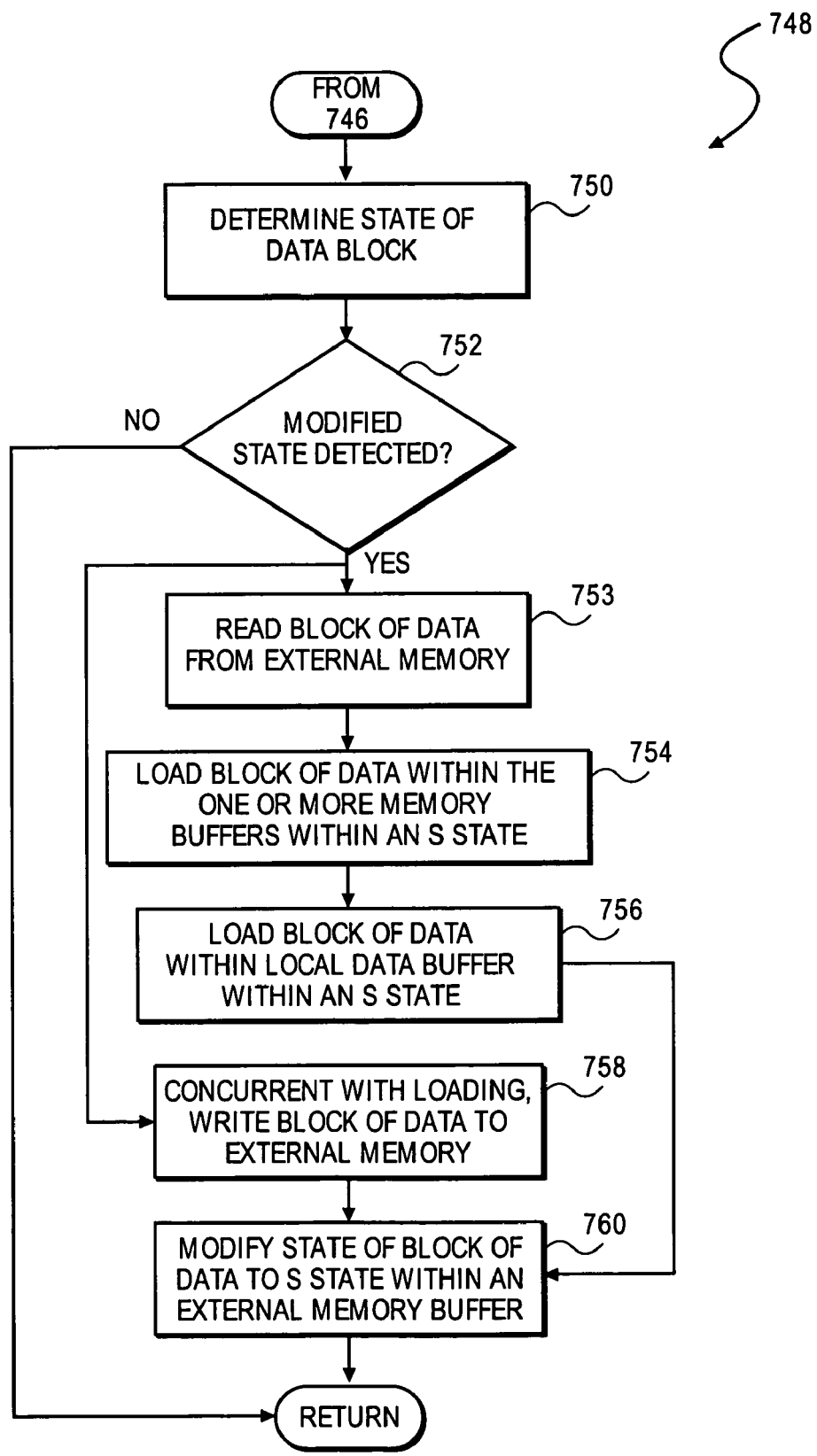
FIG. 16 depicts a flowchart illustrating an additional method for storing data within one or more memory buffers to maintain cache coherency in accordance with the further embodiment of the present invention.

Referring now to FIG. 16, FIG. 16 depicts a flowchart illustrating an additional method 748 for storing the block of data within the one or more memory buffers 160 with an S state of process block 746, as depicted in FIG. 15. At process block 750, a state of the data block is determined. Once the state of the data block is determined, at process block 752, it is determined whether a modified state of the data block is detected. When a modified state is not detected, control flow returns to process block 746, as depicted in FIG. 15. Otherwise, process block 753 is performed. At process block 753, the data block is requested from external memory, such as main memory 104, as depicted in FIG. 6.

Next, at process block 754, the block of data is loaded within the one or more memory buffers 160 with an S state. Once loaded within the memory devices 160, at process block 756, the block of data is loaded within the local data buffer, with an S state, such as for example, local cache memory 410, as depicted in FIG. 6. Concurrent with process blocks 753–756, the block of data is written to external memory, such as memory 104, as depicted in FIG. 6, at process block 758. Finally, at process block 760, the state of the block of data is modified to an S state within the external memory buffers (not shown) containing the block of data.

Figure 17:
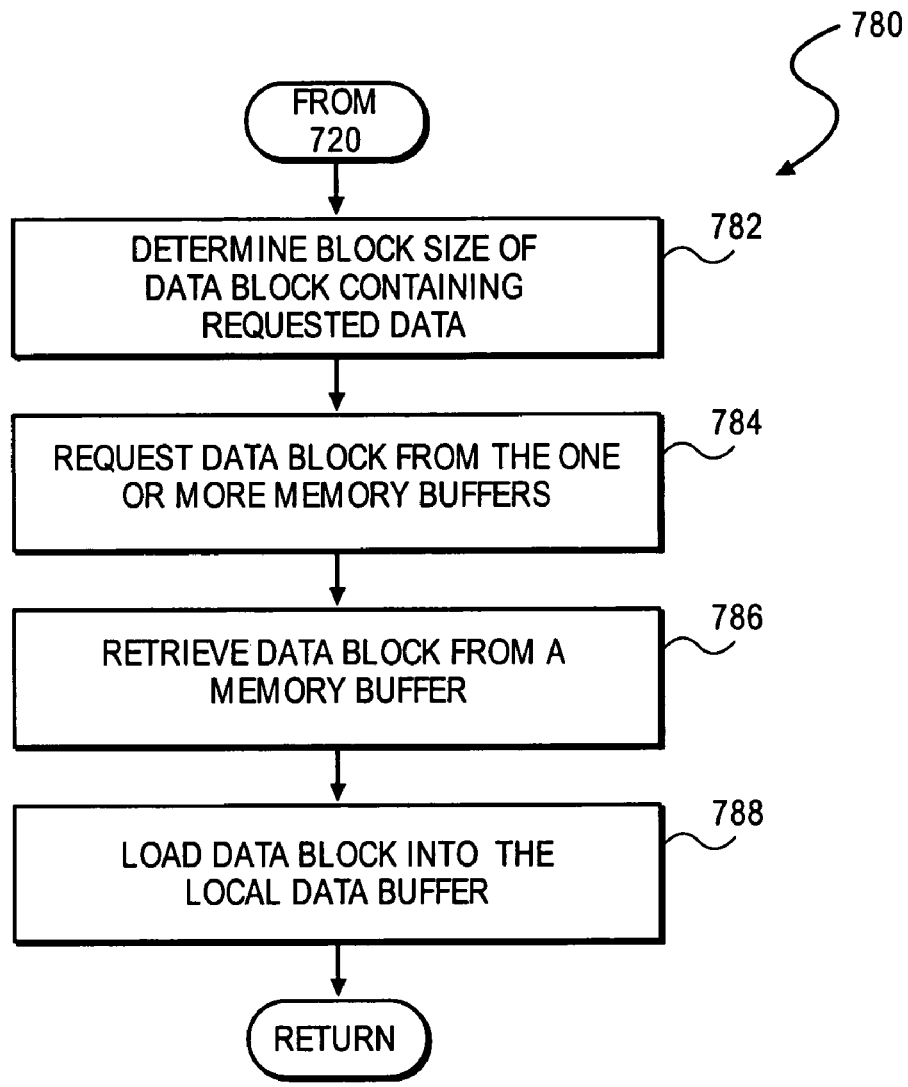
FIG. 17 depicts a flowchart illustrating an additional method for accessing data according to a memory access pattern indicated by a memory access instruction in accordance with a further embodiment of the present invention.

Referring now to FIG. 17, FIG. 17 depicts a flowchart illustrating an additional method 780 for loading a block of data into the local data buffer of process block 720, as depicted in FIG. 10. At process block 782, a block size of a data block containing data associated with the received memory-access instruction is determined. Next, at process block 784, the data block is requested from the one or more memory buffers, for example, level one cache and level two cache 160, as depicted in FIG. 6. Next, at process block 736, the block of data is received from a memory buffer. Finally, at process block 788, the block of data is loaded into the local data buffer 410.

Figure 18:
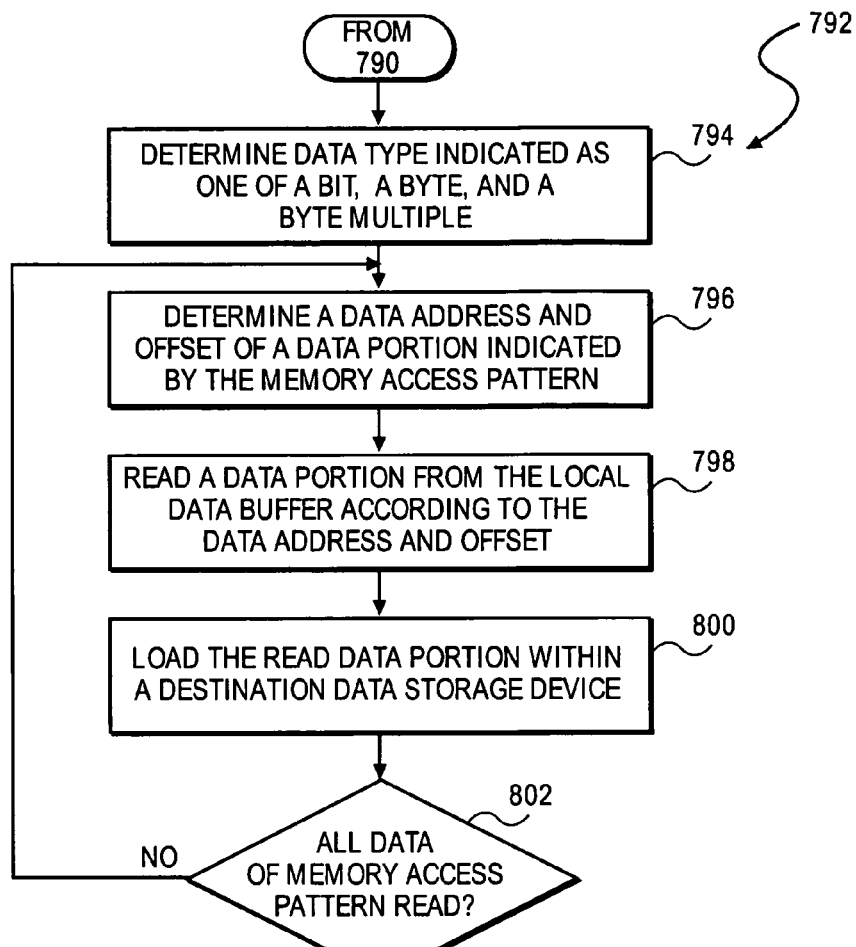
FIG. 18 depicts a flowchart illustrating an additional method for storing accessed data according to a received memory access instruction in accordance with the further embodiment of the present invention.

Referring now to FIG. 18, FIG. 18 depicts a flowchart illustrating an additional method 792 for performing the non-horizontally/non-vertically sequential access of requested data of process block 790, as depicted in FIG. 12. At process block 794, a data type indicated by the memory-access operation is determined as one of a bit, a byte or a byte multiple, such as a word, a doubleword, a quadword or the like. Next, at process block 796, a data address and data offset of a data portion is determined according to the memory-access pattern. Next, at process block 798, the data portion is read from the local cache 410. Next, at process block 800, the read data portion is loaded into a destination data storage device. Finally, at process block 802, process blocks 796 to 800 are repeated for each data portion indicated by the memory access pattern.

Figure 19:
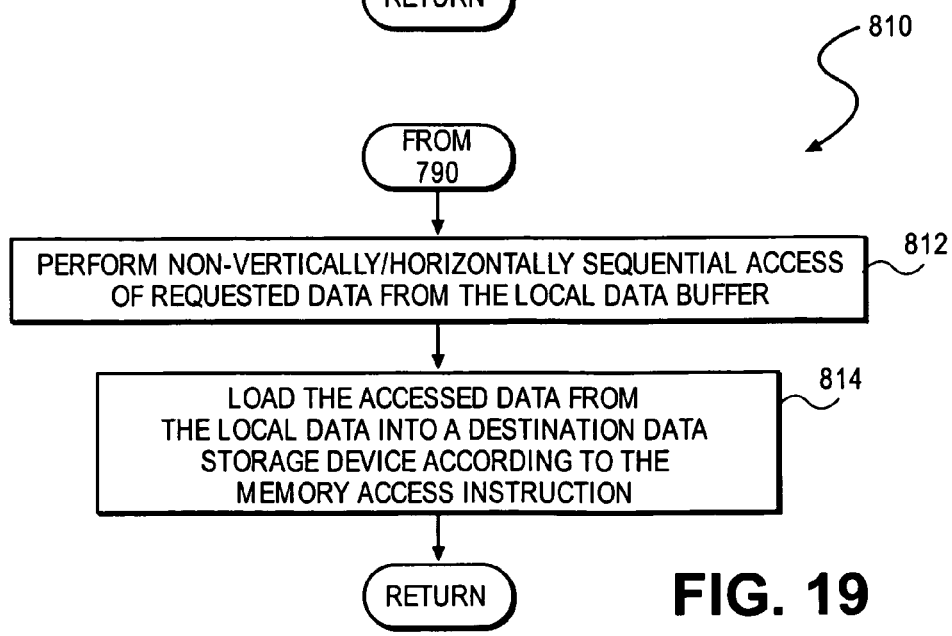
FIG. 19 depicts a flowchart illustrating an additional method for storing accessed data according to a received memory access instruction in accordance with an exemplary embodiment of the present invention.

Finally, referring to FIG. 19, FIG. 19 depicts a flowchart illustrating an additional method 810 for accessing of requested data by, for example the cache processor 400. At process block 812, CaPro 400 performs a non-vertically/non-horizontally sequential memory access of the requested data using local data buffer 410, such as local cache 410. Once the data is accessed, process block 814 is performed. At process block 814, the accessed data is loaded from the local data buffer 400 into a destination data storage device of the CPU 110. Alternatively, the data may be reorganized within local cache 410, such that CPU 110 can sequentially access the data once notified of its availability.

Consequently, utilizing the embodiments of the present invention, a cache processor in conjunction with the CP load instructions described herein enable non-horizontally/non-vertically sequential (random) memory access within the local cache memory based on a memory access pattern.

Accordingly, a CPU utilizing a cache processor is shield for the memory access time required to perform data access according to a virtually random memory access pattern as required during video/image processing operation. As such, computer systems utilizing the embodiments of the present invention can drastically improve, for example, image processing times by utilizing the CP load operations to perform data access according to a memory access pattern in response to a single instruction. As such, many of the transpose operations required when processing pixel data in random order/direction are avoided utilizing the embodiments of the present invention.

Alternate Embodiments

Several aspects of one implementation of the cache processor for providing data access according to data access patterns have been described. However, various implementations of the cache processor provide numerous features including, complementing, supplementing, and/or replacing the features described above. Features can be implemented as part of a processor die or as part of a memory controller in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

In addition, although an embodiment described herein is directed to a cache processor for providing data access according to data access patterns, it will be appreciated by those skilled in the art that the embodiments of the present invention can be applied to other systems. In fact, systems for non-vertically/horizontally sequential access of data fall within the embodiments of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The embodiments of the present invention provides many advantages over known techniques. In one embodiment, the present invention includes the ability dramatically reduce the time utilized by a processor when reading data from a memory subsystem when processing image/video data. For example, bitplane encoding in the new JPEG image coding standard is drastically reduced from the forty percent (40%) execution time required by current image/video processing applications. As such, utilizing the embodiments of the present invention, hardware bit plane extraction can be processed by the CaPro while leaving the main CPU free to handle wavelet transform and arithmetic coding. Moreover, other applications can benefit from embodiments of the CaPro like zig-zag scan, zerotree coding, MPEG4 fine granularity scalability or the like. In addition, embodiments directed to the co-processor, or CaPro, can hide access time from the CPU by performing the necessary data transformations in a local cache before sending data to the main processing unit.

Having disclosed exemplary embodiments and the best mode, modifications and variations may be made to the disclosed embodiments while remaining within the scope of the invention as defined by the following claims.

What is claimed is:

1. A method comprising:
    loading, in response to a memory access instruction, a plurality of data addresses and data offsets defined by a memory access pattern for a plurality of data elements requested by the received memory access instruction;
    accessing the plurality of data elements requested by the received memory access instruction according to the plurality of data addresses and data offsets indicated by the memory access pattern; and
    storing the accessed, plurality of data elements according to the received memory access instruction.

2. The method of claim 1, wherein loading the memory access pattern further comprises:
    determining a memory location of the memory access pattern;
    reading the plurality of data addresses defining the memory access pattern from the determined memory location;
    determining the plurality of data offsets for accessing the data requested by the received memory access instruction; and
    storing the data addresses and the data offsets to enable accessing of the data according to the memory access pattern requested by the received memory access instruction.

3. The method of claim 1, wherein accessing data further comprises:
    detecting, in response to the memory-access instruction, a buffer hit/miss of data associated by the memory-access instruction within a local data buffer;
    when a buffer miss is detected, loading a block of data into the local data buffer according to the memory-access instruction, the block of data containing the data associated with the memory-access instruction; and
    accessing the data requested by the memory-access instruction, according to the memory access pattern, from the local data buffer.

4. The method of claim 3, wherein loading the block of data further comprises:
    issuing a data request to one or more memory buffers for the block of data containing the data requested by the memory-access instruction;
    retrieving the block of data containing the data requested by the memory-access instruction from a memory buffer of the one or more memory buffers; and
    loading the received block of data into the local data buffer.

5. The method of claim 4, wherein issuing the data request further comprises:
    detecting, in accordance with the data request, a buffer hit/buffer miss of the data requested by the memory-access instruction within the one or more memory buffers;
    when a buffer miss is detected, requesting, from an external memory, a block of data containing the data requested by the memory-access instruction;
    once the block of data is received, loading the block of data into the one or more memory buffers;
    otherwise, selecting the block of data containing the data requested by the memory-access instruction from a memory buffer of the one or more memory buffers according to the memory-access instruction; and
    storing the data block containing the data requested by the memory-access instruction to the local data buffer.

6. The method of claim 3, wherein loading the block of data further comprises:
    determining a block size of the data block according to the memory-access instruction;
    requesting the data block from one or more memory buffers according to the determined block size;
    retrieving the data block from a memory buffer of the one or more memory buffers; and
    loading the data block into the local data buffer according to the memory-access instruction.

7. The method of claim 1, wherein accessing data further comprises:
    determining a data type indicated by the memory-access instruction as one of a byte and a byte multiple;
    selecting a data address and offset of a data portion indicated by the memory-access pattern;
    reading a data portion, corresponding to the determined data type, and according to the determined data address and offset, from the local data buffer;
    loading the read data portion into a destination data storage device according to the memory-access instruction; and
    repeating the determining, reading and loading for each data portion indicated by the memory access pattern.

8. The method of claim 1, wherein accessing data further comprises:
    performing non-horizontally/non-vertically sequential access of the data requested by the memory-access instruction according to the memory access pattern from a local data buffer; and
    loading the data accessed from the local data buffer into a destination data storage device according to the memory-access instruction.

9. The method of claim 5, further comprising:
    maintaining coherence of the data block containing the data requested by the memory-access instruction among the local data buffer, the memory buffers and the external memory.

10. The method of claim 1, wherein the memory-access instruction is one of a read instruction and a write instruction.

11. An apparatus, comprising:
    an execution unit having circuitry to execute instructions;
    a local data buffer, coupled to the execution unit, the local data buffer to enable access of data contained therein according to a memory access pattern; and
    a storage device coupled to the execution unit, having sequences of instructions stored therein, which when executed by the execution unit cause the execution unit to:
    load, in response to a memory access instruction, a plurality of data addresses and data offsets defined by a memory access pattern a plurality of data elements requested by the received memory access instruction;
    access the plurality of data elements requested by the received memory access instruction according to the plurality of data addresses and data offsets indicated by the memory access pattern; and store the accessed, the plurality of data elements according to the received memory access instruction to enable sequential access of the stored data.

12. The apparatus of claim 11, wherein to load the memory access pattern further causes the execution unit to:
determine a memory location of the memory access pattern;
read the plurality of data addresses defining the memory access pattern from the determined memory location;
determine the data offsets for accessing the data requested by the received memory access instruction; and
store the data addresses and the data offsets to enable accessing of the data according to the memory access pattern requested by the received memory access instruction.

13. The apparatus of claim 11, wherein the instruction to access data further causes the execution unit to:
detect, in response to the memory-access instruction, a buffer hit/miss of data requested by the memory-access instruction within the local data buffer;
when a buffer miss is detected, load a block of data into the local data buffer according to the memory-access instruction, the block of data containing the data associated with the memory-access instruction; and
access the data requested by the memory-access instruction, according to the memory access pattern, from the local data buffer.

14. The apparatus of claim 13, wherein the instruction to load the data block further causes the execution unit to:
issue a data request to one or more memory buffers for the block of data containing the data requested by the memory-access instruction;
retrieve the block of data containing the data requested by the memory-access instruction from a memory buffer of the one or more memory buffers; and
load the received block of data into the local data buffer.

15. The apparatus of claim 14, wherein the instruction to issue the data request further causes the execution unit to:
detect, in accordance with the data request, a buffer hit/buffer miss of the data requested by the memory-access instruction within the one or more memory buffers;
when a buffer miss is detected, request, from an external memory, a block of data containing the data requested by the memory-access instruction;
once the block of data is received, load the block of data into the one or more memory buffers;
otherwise, select the block of data containing the data requested by the memory-access instruction from a memory buffer of the one or more memory buffers according to the memory-access instruction; and
store the data block containing the data requested by the memory-access instruction to the local data buffer.

16. The apparatus of claim 13, wherein the instruction to load the data block further causes the execution unit to:
determine a block size of the data block according to the memory-access instruction;
request the data block from one or more memory buffers according to the determined block size;
retrieve the data block from a memory buffer of the one or more memory buffers; and
load the data block into the local data buffer according to the memory-access instruction.

17. The apparatus of claim 11, wherein the instruction to access data further causes the execution unit to:

determine a data type indicated by the memory-access instruction as one of a byte and a byte multiple;
select a data address and offset of a data portion indicated by the memory-access pattern;
read a data portion, corresponding to the determined data type, and according to the determined data address and offset, from the local data buffer;
load the read data portion into a destination data storage device according to the memory-access instruction; and
repeat the determine, read and load for each data portion indicated by the memory access pattern.

18. The apparatus of claim 11, wherein the instruction to access data further causes the processor to:
perform non-horizontally/non-vertically sequential access of data requested by the memory-access instruction according to the memory access pattern from the local data buffer; and
load the data accessed from the local data buffer into a destination data storage device according to the memory-access instruction.

19. The apparatus of claim 11, wherein the execution unit is further caused to:
maintain coherence of the data block containing the data requested by the memory-access instruction among the local data buffer, one or more memory buffers and external memory.

20. The apparatus of claim 11, wherein the memory-access instruction is one of a read instruction and a write instruction.

21. A system, comprising:
a central processor having one or more memory buffers coupled to the processor via a memory bus; and
a co-processor coupled to the central processor via a system bus, the co-processor having a local data buffer, coupled to the co-processor via a bus, the local data buffer configured to enable non-horizontally/non-vertically local data sequential access of data contained therein, wherein the co-processor, in response to a memory access instruction, accesses data from the local cache according to a memory access pattern indicated by the memory access instruction.

22. The system of claim 21, further comprising:
an external memory coupled to the processor via the system bus, including one or more external data buffers, wherein the co-processor, in response to a buffer miss of data associated with the memory access instruction, loads data into the local data buffer when a buffer miss is detected in response to a memory access instruction from one or more of the one or more memory buffers, the external data buffers and the one or more external data buffers.

23. The system of claim 21, wherein the cache processor accesses one of bit-data of byte multiple according to a data type indicated by the received memory access instruction.

24. The system of claim 21, wherein the co-processor further comprises:
one or more data storage devices, such that data accessed, according to the memory access pattern, is stored within the one or more data storage devices prior to being provided to the central processor.

25. The system of claim 21, wherein the co-processor further comprises:
an execution unit coupled to the co-processor; and
a storage device coupled to the execution unit, having sequences of instructions stored therein, which when executed by the execution unit cause the first memory buffer to:

determine, in response to a memory access instruction, a memory access pattern of data associated with the received memory access instruction;
  detect, in response to a memory-access request from the execution unit, a buffer hit/miss of data requested by the memory-access instruction within the local data buffer,
  when a buffer miss is detected, load a block of data from the memory buffers into the local data buffer according to the memory-access instruction, the block of data containing the data associated with the memory-access instruction,
  access the data associated with the memory-access instruction according to the memory access pattern from the local data buffer, and
  provide the accessed data to the central processor.

26. The system of claim 21, wherein the co-processor is further caused to maintain coherence of the data among the local data buffer and the memory buffers, the external memory and the external memory buffers.

27. The system of claim 21, wherein the instruction to perform the non-horizontally sequential access further causes the first memory buffer to:
  perform non-horizontally/non-vertically sequential access of data associated with the memory-access instruction according to the memory access pattern from the local data buffer; and
  load the data accessed from the local data buffer into a destination data storage device according to the memory-access instruction.

28. The system of claim 21, wherein the system is fabricated onto a printed wiring board on which a parallel bus is formed, an integrated circuit (IC) chip package being operatively installed on the board to communicate using the parallel bus, the package having an IC chip that includes the central processor and the co-processor and an I/O section as an interface between the central processor, the co-processor and the bus, such that the co-processor performs, in response to a memory access request from the central processor, non-horizontally/non-vertically sequential access of data within the local data buffer according to the memory access pattern.

29. The system of claim 28, wherein the co-processor further comprises:
  an execution unit coupled to co-processor to perform data access according to the memory access pattern indicated by the memory access request; and
  the central processor includes one or more memory buffers coupled to the processor.

30. The system of claim 28, wherein the system further comprises:
  a second IC chip package, including an I/O interface to enable communication between one or more external memory buffers, an external memory and the co-processor.

31. A computer readable storage medium including program instructions that direct a computer to function in a specified manner when executed by a processor, the program instructions comprising:
  loading, in response to a memory access instruction, a plurality of data addresses and data offsets defined by a memory access pattern for a plurality of data elements requested by the received memory access instruction;
  accessing the plurality of data elements requested by the received memory access instruction according to the plurality of data addresses and data offsets indicated by the memory access pattern; and
  storing the accessed, plurality of data elements according to the received memory access instruction.

32. The computer readable storage medium of claim 31, wherein accessing data further comprises:
  performing non-horizontally/non-vertically sequential access of the data requested by the memory-access instruction according to the memory access pattern from a local data buffer; and
  loading the data accessed from the local data buffer into a destination data storage device according to the memory-access instruction.

33. The computer readable storage medium of claim 31, wherein the memory-access instruction is one of a read instruction and a write instruction.

34. A method comprising:
  accessing, in response to execution of a memory access instruction, non-horizontally/non-vertically sequential data according to a memory access pattern associated with the memory access instruction; and
  loading the data accessed according to the memory access pattern into a destination data storage device according to the memory access instruction to enable sequential access of the data.

35. An apparatus comprising:
  a local data buffer; and
  an execution unit coupled to the local data buffer, the execution unit in response to execution of a memory access instruction having an associated memory access pattern to access non-horizontally/non-vertically sequential data according to the memory access pattern associated with the memory access instruction and to store the accessed data within the local data buffer to enable sequential access of the data.

36. An apparatus comprising:
  an execution unit having circuitry to execute instructions;
  a local data buffer, coupled to the execution unit, the local data buffer to enable access of data contained therein according to a memory access pattern; and
  a storage device coupled to the execution unit having stored at least one memory access instruction having an associated memory access pattern, which when executed by the execution unit, causes the execution unit to access non-horizontally/non-vertically sequential data from the local buffer and to store the accessed data within a destination data storage device according to the memory access instruction to enable sequential access of the stored data.

37. An apparatus comprising:
  an execution unit having circuitry to execute instructions;
  a local data buffer, coupled to the execution unit, the local data buffer to enable access of data contained therein according to a memory access pattern associated with a memory instruction; and
  a storage device coupled to the execution unit having at least a memory access instruction having an associated memory access pattern, which when executed by the execution unit, causes the execution unit to:
    load a block of data into the local data buffer according to the memory access instruction, the block of data containing data associated with the memory access instruction if a buffer hit/miss of data associated with the memory access instruction is detected, and
    access non-horizontally/non-vertically sequential data from the local data buffer according to the memory access pattern.

* * * * *

UNITED STATES PATENT AND TRADEMARK OFFICE
CERTIFICATE OF CORRECTION

| | | |
|---|---|---|
| PATENT NO. | : 7,143,264 B2 | Page 1 of 1 |
| APPLICATION NO. | : 10/268166 | |
| DATED | : November 28, 2006 | |
| INVENTOR(S) | : Debes et al. | |

It is certified that error appears in the above-identified patent and that said Letters Patent is hereby corrected as shown below:

Column 9, at line 58, delete "SINM" and insert --SIMD--.

Signed and Sealed this

Sixth Day of November, 2007

JON W. DUDAS
*Director of the United States Patent and Trademark Office*